(12) United States Patent
Hoffland

(10) Patent No.: US 7,585,413 B2
(45) Date of Patent: Sep. 8, 2009

(54) METHOD AND APPARATUS FOR TREATING ANIMAL WASTE AND WASTEWATER

(76) Inventor: Robert O. Hoffland, 10391 Silver Spring Rd., Conroe, TX (US) 77303

( * ) Notice: Subject to any disclaimer, the term of this patent is extended or adjusted under 35 U.S.C. 154(b) by 69 days.

(21) Appl. No.: 11/194,829

(22) Filed: Aug. 1, 2005

(65) Prior Publication Data

US 2006/0060525 A1 Mar. 23, 2006

Related U.S. Application Data

(63) Continuation-in-part of application No. 10/679,770, filed on Oct. 6, 2003, now Pat. No. 7,005,068, which is a continuation-in-part of application No. 09/789,265, filed on Feb. 20, 2001, now Pat. No. 6,630,072.

(51) Int. Cl.
C02F 3/30 (2006.01)
(52) U.S. Cl. ............ 210/603; 210/605; 210/916; 435/262.5
(58) Field of Classification Search ......... 210/603, 210/605, 621, 622, 630, 916; 435/262, 262.5; 71/21
See application file for complete search history.

(56) References Cited

U.S. PATENT DOCUMENTS

| | | | | |
|---|---|---|---|---|
| 3,546,812 A * | 12/1970 | Kobayashi | ............ | 47/1.4 |
| 4,824,563 A * | 4/1989 | Iwahori et al. | ............ | 210/195.1 |
| 4,966,705 A * | 10/1990 | Jamieson et al. | ............ | 210/605 |
| 5,232,583 A * | 8/1993 | Koster et al. | ............ | 210/96.1 |
| 5,296,147 A * | 3/1994 | Koster et al. | ............ | 210/605 |
| 5,545,326 A * | 8/1996 | Petering | ............ | 210/605 |
| 5,593,590 A * | 1/1997 | Steyskal | ............ | 210/603 |
| 5,744,041 A * | 4/1998 | Grove | ............ | 210/602 |
| 6,039,874 A * | 3/2000 | Teran et al. | ............ | 210/605 |
| 6,103,123 A * | 8/2000 | Gantzer | ............ | 210/605 |
| 6,117,324 A * | 9/2000 | Greene et al. | ............ | 210/627 |
| 6,136,185 A * | 10/2000 | Sheaffer | ............ | 210/153 |
| 6,235,196 B1 * | 5/2001 | Zhou et al. | ............ | 210/605 |
| 6,436,288 B1 * | 8/2002 | Burcham et al. | ............ | 210/602 |
| 6,514,410 B1 * | 2/2003 | Gantzer | ............ | 210/605 |
| 6,558,548 B2 * | 5/2003 | Svirklys et al. | ............ | 210/603 |

FOREIGN PATENT DOCUMENTS

GB 2167055 * 5/1986
JP 56-126490 * 10/1981

* cited by examiner

*Primary Examiner*—Fred Prince
(74) *Attorney, Agent, or Firm*—Matthews, Lawson & Bowick PLLC

(57) ABSTRACT

Novel methods and apparatuses are disclosed for the treatment of wastewater to reduce, often associated, offensive odors. Irrigation of oxygenated liquid on top of a permeable cover effectively creates an aerobic treatment zone at the top of the lagoon whereby odorous gases being produced anaerobically below the cover are metabolized within this zone before being released to the atmosphere. This same system also serves to increase evaporation from the overall waste handling system therefore substantially reducing or eliminating the need for land application of treated wastewater.

31 Claims, 30 Drawing Sheets

METHOD AND APPARATUS FOR TREATING ANIMAL WASTE AND WASTEWATER

RELATED APPLICATIONS

This is a Continuation in Part of U.S. application Ser. No. 10/679,770, entitled "Methods and Apparatuses for Treating Wastewater," filed on Oct. 6, 2003 and now issued as U.S. Pat. No. 7,005,068 and is a Continuation in Part of U.S. application Ser. No. 09/789,265, entitled "Methods and Apparatuses for Treating Wastewater," filed on Feb. 20, 2001 and now issued as U.S. Pat. No. 6,630,072.

TECHNICAL FIELD

This invention generally relates to apparatuses and methods for treating water and other fluids, including, but not limited to, agricultural and industrial waste water to cut the production of offensive odors. More specifically, it relates to methods and apparatuses to substantially reduce odor and other odorous compounds from being emitted from organic waste storage structures or lagoons and the elimination of application of excess plant nutrients to cropland.

BACKGROUND OF INVENTION

For purposes of this patent, the following terms are defined. As used herein, the term "conveyed" or "convey" means and refers to any system or process for directing, channeling, sending, spraying, blowing, moving, funneling, pouring, pumping wastewater or other solid or at partially liquid material. As used herein, the term "tank" means and refers to a bin(s), pond(s), container, area, and the like. As used herein, the term "trolley" means and refers to a bin, tank, collection site, collection vehicle, area, pile, and the like. As used herein, the term "pass," "passing," "passed," and other conjugations means and refers to convey, to direct and/or to transport via any method or structure common in the art such as a conduit, pipe, funnel, trough, line, slope, gully, trench, river, stream, and the like. As used herein, the term "lagoon" means and refers to a lagoon, pond, lake, stream, retention structure, facultative pond and the like, whether earthen or lined pit such as by concrete, plastic or metal and the like. When wild hogs roamed the forest in sparse numbers with the population determined by the available food sources, the environmental impact of the hog excretion was insignificant. The individual animal roamed freely, spreading his waste over large areas as he traveled. Later, when man domesticated hog and other livestock and as environmental regulations began to address such wastes, the disposal, treatment, and recycling of the, and increased the local concentration to correspond to the caretakers food production, the environmental impact of waste was at first minimal. The farmer removed the waste manure from the pig-sty and spread it over his farm for fertilizer.

In recent times, however, livestock production density has dramatically increased. For example, the specialty hog production operators purchased their hog feed (cereal grains) from other farmers who specialized in the production of grain cereal. This enables one operator to have the hog production facility of 10,000 head of hogs or more. The production of hog manure now becomes a problem. The spreading of large quantities of hog manure on land requires an extensive amount of land. The soil has a finite capacity to degrade animal feces, and when exceeded it becomes the equivalent of a pile of manure. The waste is often accumulated and dispersed over the cropland at specific times of the year. However, there are physical limitations on the distribution of the waste because it cannot be practically applied to near mature crops without the destruction of the crop. Also it cannot be applied when the waste may run off the soil because the soil is saturated or frozen. In fact, several states within the U.S. have created regulations prohibiting land application during the winter months.

In addition to the practical limits of the distribution of animal feces, regulatory agencies have applied limits on the amount of feces that may be spread. The regulations limit the amount of animal feces per acre to be about equivalent to the plant uptake of the non-biodegradable components. These regulations were created to prohibit the surface run-off from storm water and the excess percolation of the soluble waste components into the ground water.

In recent times, livestock producers have elected to create pits or lagoons for the collection of the waste. In the barns or houses, the animals live on elevated flooring which permits the feces to drop through the floor to a sub-floor. This sub-floor is periodically flushed to remove the feces and maintain a healthy living environment. The feces, with the wash down water as a vehicle, flow to the storage lagoon. The water utilized to flush the livestock production floor and move the freshly produced feces to the lagoon is usually recycled supernatant from the storage lagoon. Recycling the wastewater provides two advantages to the producer. First, it reduces that amount of fresh water that must be provided and secondly, since it is recycled from the storage lagoon, the size of the storage facility can be significantly reduced.

The problem with the recycled water is that it contains high levels of ammonia (breakdown product of the waste urea) and odors, which are not beneficial to the health of the livestock. High levels of ammonia in the flush water require the building to be vented to reduce the ambient levels of ammonia. Increased ventilation lowers the ambient temperatures in the winter. The lower temperatures lower the rate of weight gain of the animals and increase the food requirement of the animal to maintain body temperature.

Biological cultures purify water by exploiting the metabolic processes of various bacterial and algal species to convert organic and inorganic waste products into benign end products, typically carbon dioxide and a reproduction of the species. However, intermediate products formed by biological processes can include methane and sulfur containing gases, volatile organic acids or other volatile or odiferous products, depending on the nature of the culture, the waste being digested and the ambient environment.

Biological cultures can be fostered of desirable microorganisms, which provide the functional basis for the wastewater treatment by metabolically converting the waste products. However, cultures of undesirable microorganisms which produce undesirable tastes, odors, growths, or which are actually toxic are also possible. Therefore, it is important in biological wastewater treatment that cultures of suitable microorganisms are fostered and the undesirable cultures avoided.

The organic material in the wastewater serves both as an energy source and a source of carbon for cell synthesis by the microorganisms of the culture. Microorganisms are both reactants and products in the biological treatment of wastewater. Typical configurations of biological reactor cultures for purifying water include suspended culture processes and attached growth systems such as fixed-film reactors. Suspended cultures include activated sludge (facultative cultures), aerated lagoons, oxidation ponds, and anaerobic cultures.

The oxygen level present in the culture material affects biological digestion of organic waste material because the oxygen level determines the metabolic pathway available to the microorganism. Aerobic conditions provide plenty of oxygen to the culture, and foster the growth of microorganisms that can use the exogenous oxygen as a terminal electron acceptor in the oxidation of organic acids generated form the metabolic breakdown of organic material, i.e. aerobic biological activity. If insufficient exogenous oxygen is available to the culture, the conditions are anaerobic. Under anaerobic conditions, the absence of oxygen as a terminal electron acceptor results in the excretion of organic acids into the culture medium as waste.

Farmers often create storage lagoons on their farms to accumulate and store the flushed wastewater, feces and urine until an appropriate time to distribute the wastes over the land. The surface water is utilized as flush water not only to reduce the amount of water consumed by the animal production, but also to conserve the capacity of the lagoon. Using the lagoon water for flushing reduces the water consumption by 70-90% and proportionally reduces the required size of the lagoon. The wastewater is usually stored until planting time and applied to cropland in place of a commercial fertilizer.

Currently, during the storage process, due to the large volume of animal waste entering the lagoon, there is insufficient oxygen present to support the growth of aerobic cultures and/or aerobic biological activity. In the absence of the desired oxygen, the microbial growth in the lagoon converts to anaerobic activity. This anaerobic activity leads to what is commonly known as a "septic" lagoon. In a septic lagoon a very foul odor is present from the production of hydrogen sulfide, organic-sulfide compounds, organic acids, and etc. When the accumulated waste liquid is distributed over the cropland by spray irrigation, the foul smelling volatile gases are liberated, producing a very undesirable environment.

Aeration equipment can be installed to provide sufficient dissolved oxygen to maintain an aerobic culture. However, the energy cost to operate the aerobic treatment is very cost prohibitive. There are several methods of aeration available. Surface aerators are commonly used in large open areas. The surface aerator consists of an electric motor driven impeller suspended in the throat of a venturi with the entire unit mounted on a float to suspend the impeller just below the surface. As the impeller spins, it pumps the water up forming a large circular spray. Oxygen is dissolved in the water as it falls through the air. The amount of water spray and subsequently the amount of oxygen dissolved is directly proportioned to the amount of water pumped and therefore the horsepower of the motor and energy consumed.

Another commonly used method to increase the dissolved oxygen content of the lagoon is to blow air thorough an aeration system located on the bottom of the pond. The air is forced through a device with small openings to create small bubbles. As the bubbles rise through the liquid, oxygen is dissolved in the water. Again the amount of oxygen dissolved is directly proportional to the amount of air forced into the basin and therefore the horsepower utilized and energy consumed.

With these methods, it is possible to provide enough energy to supply sufficient oxygen to maintain an aerobic culture, but such methods are not entirely practical. The average waste generated by swine production is 3.1 pounds of BOD and 8.4 pounds of COD per day per 1000 pounds of livestock. This amount would be very cost prohibitive with the prior art methods. Other methods that have developed that concentrate on screening the undissolved particles from the wastewater prior to flushing. Typically, the flush water will consist of both dissolved ingredients and suspended undissolved solids or particles (undissolved ingredients). These undissolved particles are of varying size from sub-micron to much larger visible particles.

There are a variety of screen separators being used in the art field for such screening. However, the screens only remove about 15-20% of the organic mass. These large particles that can be screened are insignificant in the treatment process because removing only 20% of the organic mass will only reduce the energy consumption by 20%. Various types of screen—gravity inclined screen, inclined screens with roll compactor, rotating screens, screens with drag chains, have been utilized with either wedge wire construction or perforated metal construction and types produce essentially the same results in that most of the particles are too small to be removed by screen-separating devices. In any case, the majority of the fecal matter is unscreened and left to produce the foul smell and septic environment as heretofore described.

The foul odors of wastewater become apparent in most operations, including, but not limited to:

(a) When the stored water is returned to the barns as flush water, odors are liberated;

(b) Spray operations: when the wastewater is applied to the cropland by spray irrigation (most common method), the liquid is pumped under high pressure through a nozzle and sprayed over large area. The spray area as well as all areas downwind has a putrid odor and is very undesirable;

(c) Winter thermal changeover: In the winter to spring of the year, the normal thermo dine of the lagoon is disturbed. Due to the temperature differences the bottom layers roll to the surface, creating an extra heavy liberation of noxious odors. Another disadvantage of the temperature change and decreased temperature in the lagoon causes a decrease in the metabolic rate of the bacteria which are utilizing the carbon and nitrogen as food nutrients on energy; and (d) the like.

Over the past few decades, more people have found it desirable to live in a country atmosphere rather then the conventional city life resulting in a greater number of people living near agricultural centers. The foul odor emanating from the anaerobic lagoons and spray fields has increasingly become a major area environmental issue. For example, the state of North Carolina has recently passed a moratorium prohibiting the creation of any new anaerobic lagoons. In fact, new rules are being created to phase out the use of all anaerobic lagoons because of the environmental and social problems. Other areas have proposed methods for the treatment of agricultural wastewater using biological techniques, the problem of odor and the economical removal of the source of the odor has not been addressed. The foul odor can be altogether prevented or mitigated by collection and use of the biogas or by semi-permeable membranes that oxidize and deodorize odors. Also, the biogas comprises as useful energy source that can be used for energy, to generate electricity, and to even speed the rate of reaction by raising the temperature of the wastewater, for example, the anaerobic digester.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF EMBODIMENTS OF THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. The terms "upstream" and "downstream" are intended to describe the connected relationship of the wastewater treatment modalities of the present invention, and are not intended to imply altitudinal or transformational relationship of the treatment modalities or the wastewater therein. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

Various embodiments of the present invention address problems associated with odors associated with the treatment of wastewater through reduction of solid and dissolved waste material.

Figure 1:
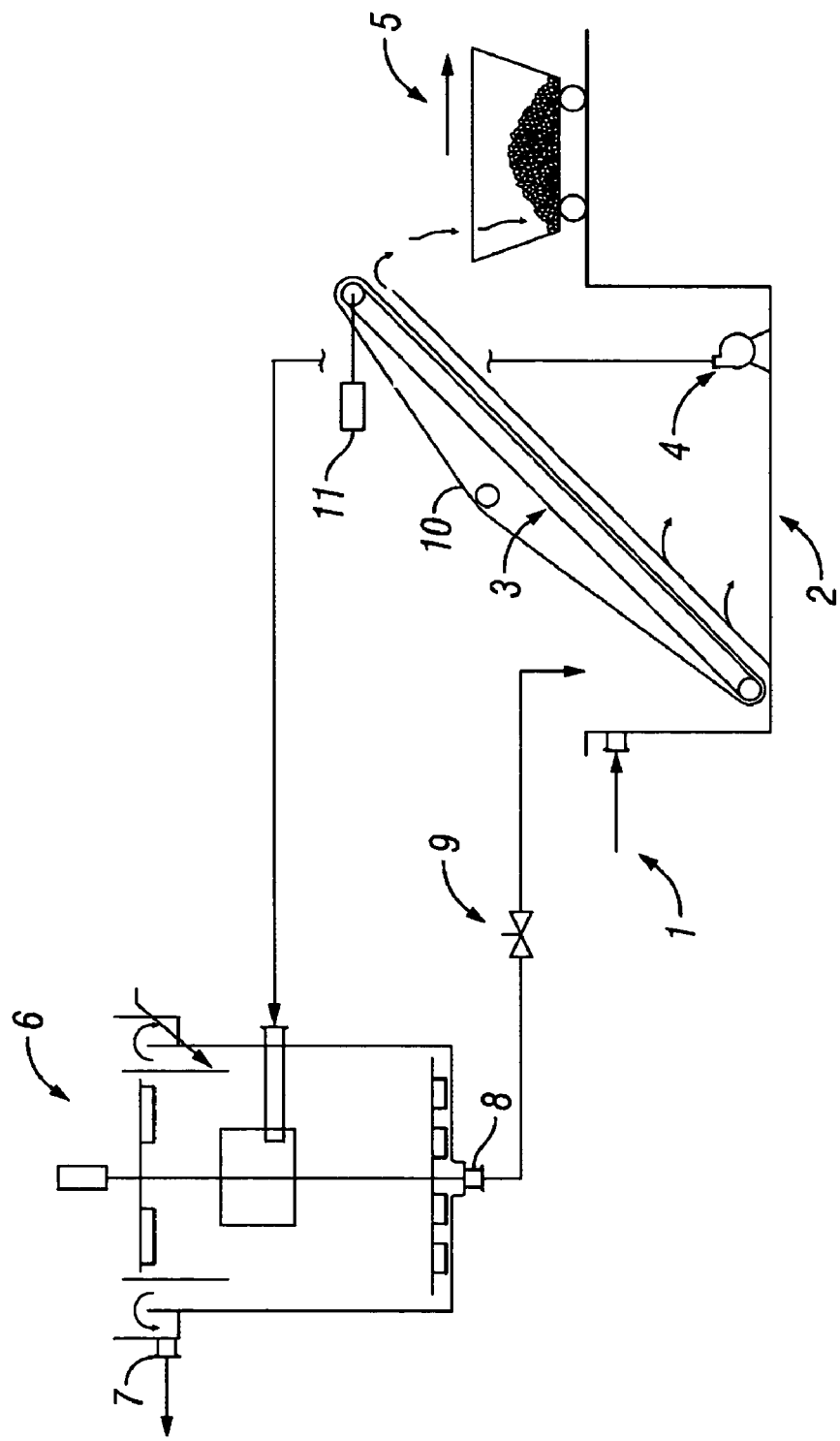
FIG. 1 is an illustration of an embodiment of the present invention.

Now referring to FIG. 1, an illustration of an embodiment of the present invention, an apparatus for treatment of wastewater is disclosed. In this embodiment, the present invention comprises a wastewater source 1, a grade screen separation device 3, a pit 2, a hopper 5, and a clarifier 6. Wastewater is conveyed to a pit 2 with a grade screen separation device 3. The wastewater may come from any source that comprises animal feces with at least one organic carbon component at least a portion of which is an insoluble solid and a nitrogenous waste. Examples of sources include, but are not limited to, livestock production facilities; such as cattle, swine, goat, sheep, horse and the like, chicken ranches, duck farms, geese farms, human waste, and the like. Pit 2 may be of any depth dependent on several factors, including, but not limited to, the volume of wastewater treated, the available space, the size of device 3, and the like. In fact, various embodiments do not use a pit 2, but rather, other suitable substitutes. Examples of suitable substitutes for pit 2 include bins, tanks, slopes, ponds, tables, and the like. Wastewater conveyed to pit 2 is screened to remove a portion of the solid material by grade separation device 3 such that a portion of a solid material is screened while a portion of the liquid material passes through the screen. Grade separation device 3 may be set in any orientation of inclination in relation to horizontal desired. In an embodiment, device 3 is horizontal. In other embodiments, device 3 is inclined or declined from horizontal. Further, device 3 may include a screen 10. Screen 10 may have holes or passages of varying size depending upon the size of solid material sought to be screened. Further, various embodiments may rotate screen 10 about a plane of orientation of device 3. In an embodiment, the screen is rotated about a portion of device 3 by pulleys and gears. In another embodiment, the screen is agitated or moved in alternating directions to sift solid material from the wastewater. The rotation, agitation, movement, locomotion and/or the like of screen 10 may be accomplished by a motor 11. However, any method or device common in the art may be used.

The solid material and/or particles collected on or about screen 10 may be conveyed out of pit 2 and off of device 3 into a trolley 5 or other device for collection. Once collected the solid material may be disposed of or used by any method common in the art. Screen 10 of device 3 may be of any size and/or the holes through screen 10 may be of any size. The more fine the screen holes are, or the smaller the holes in the screen, the more solid material that may be removed.

The liquid that is collected or left in pit 2 may then be conveyed to a clarifier 6. In an embodiment, the liquid conveyed is pumped into clarifier 6 by a pump 4. Various embodiments of the present invention utilize any variety of clarifier. In an embodiment, clarifier 6 is an elevated gravity flow clarifier. However, other embodiments use forced circulation and inclined clarifiers. Clarifier 6 acts further to remove solid and dissolved material from the wastewater.

In an embodiment, as the wastewater is clarified, a sludge collects about a portion of the clarifier. In one of the embodiments of this type, a sludge collects about the lower portion of the clarifier. The sludge may be drained or removed from clarifier 6 at a location 8. In various embodiments, the removed sludge may be conveyed back to pit 2 for further separation and disposal. In other embodiments, the sludge is used for a further process. The flow of removed sludge from clarifier 6 may be controlled by a valve 9 to limit the amount of material withdrawn from clarifier 6 or to control or select the time and/or conditions when sludge is removed from clarifier 6.

Various embodiments of clarifier 6 may include portions, pieces and apparatuses that are common in the art for the treatment of a wastewater. One example of an appropriate clarifier is a Hoffland-Environmental circular up-flow clarifier. However, other clarifiers may be used and will be readily known and apparent in the art.

To facilitate the removal of sludge collected about portions of clarifier 6 a variety of sludge rakes may be used either in combination or alternatively. One such example of a sludge rake includes, but is not limited to, a Hoffland-Environmental sludge rake. Various other embodiments of clarifier 6 may utilize a top scum rake to collect solid material above the bottom of clarifier 6. One such example is, but is not limited to, the Hoffland-Environmental scum rake. However, various embodiments may not use a top or a bottom scum rake.

As wastewater is treated in clarifier 6 a portion of the solid material may be removed from the wastewater such that wastewater may be further cleaned and solid particle and dissolved particle content reduced. In an embodiment, clarified wastewater is allowed to exit clarifier 6 about an opening 7. The clarified wastewater allowed to exit may be conveyed to a lagoon, holding pond, facultative pond, or other structure for further use or disposal. Various methods of collection and removal of clarified wastewater from clarifier 6 may be used and are well known in the art. In an embodiment, a portion of the clarified wastewater removed is recycled for further use in the wastewater treatment process and/or facility. In another embodiment, the wastewater in the lagoon is used for fertilization.

The treatment of wastewater by these various processes and apparatuses will reduce the solids contained in the wastewater thereby reducing the BOD and COD of the wastewater and consequently reducing the amount of oxygen necessary to maintain aerobic processes. The maintenance of an aerobic treatment process will reduce unpleasant odors and toxicity and make the further use of the wastewater more practical for other operations including, but not limited to, fertilization and the like.

Figure 2:
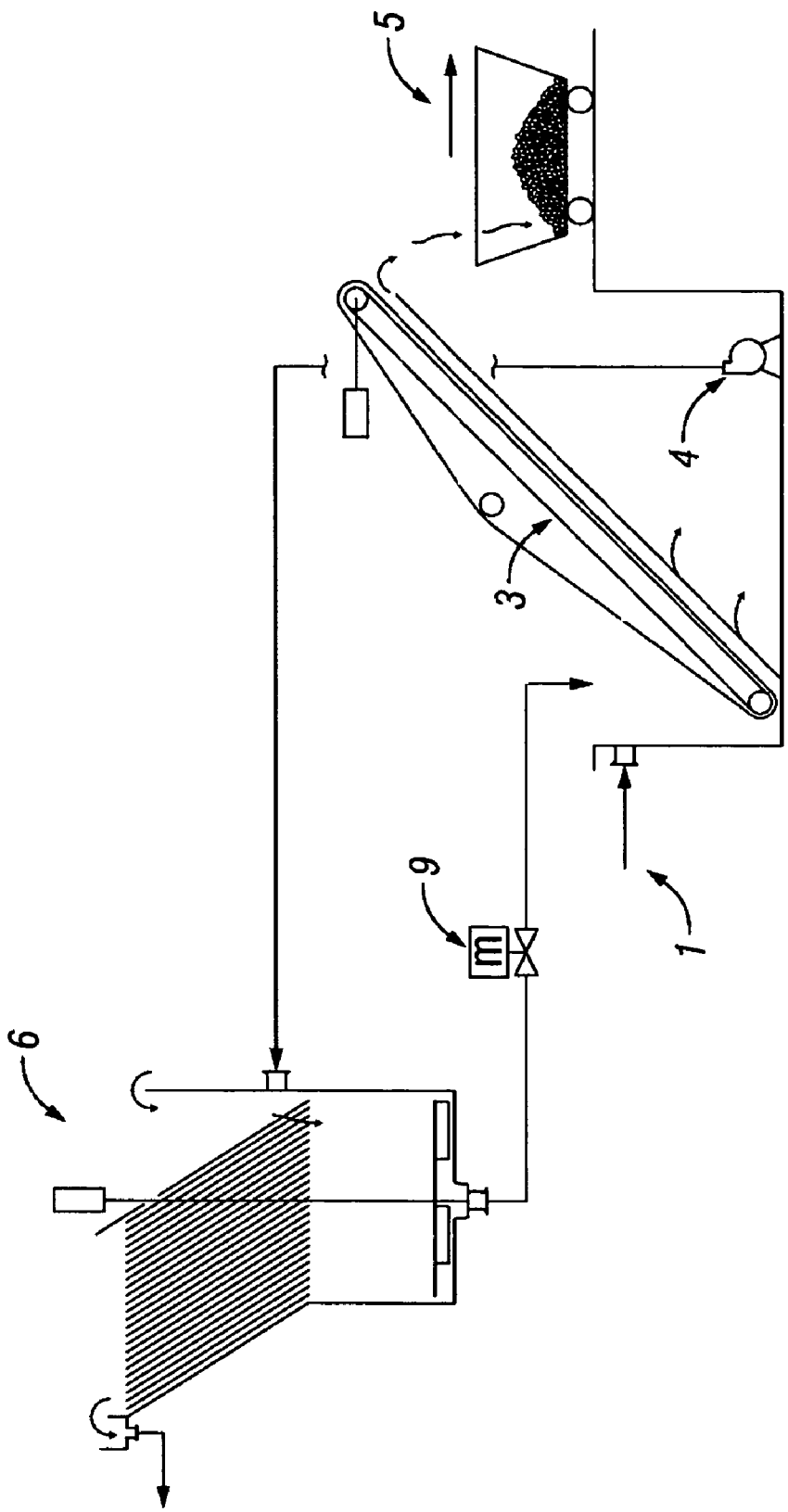
FIG. 2 is an illustration of an alternate embodiment of the present invention.

Now referring to FIG. 2, an alternate embodiment of the present invention is disclosed. Clarifier 6 is illustrated as an inclined plane clarifier. The inclined plane clarifier acts as a settling tank to separate additional solid material from the wastewater. Such devices are known in the art. An inclined plane clarifier better maximizes setting area and minimizes the required floor space. However, screening may be avoided altogether, and the solids portion can instead be concentrated in a clarifier, as discussed below.

Figure 3:
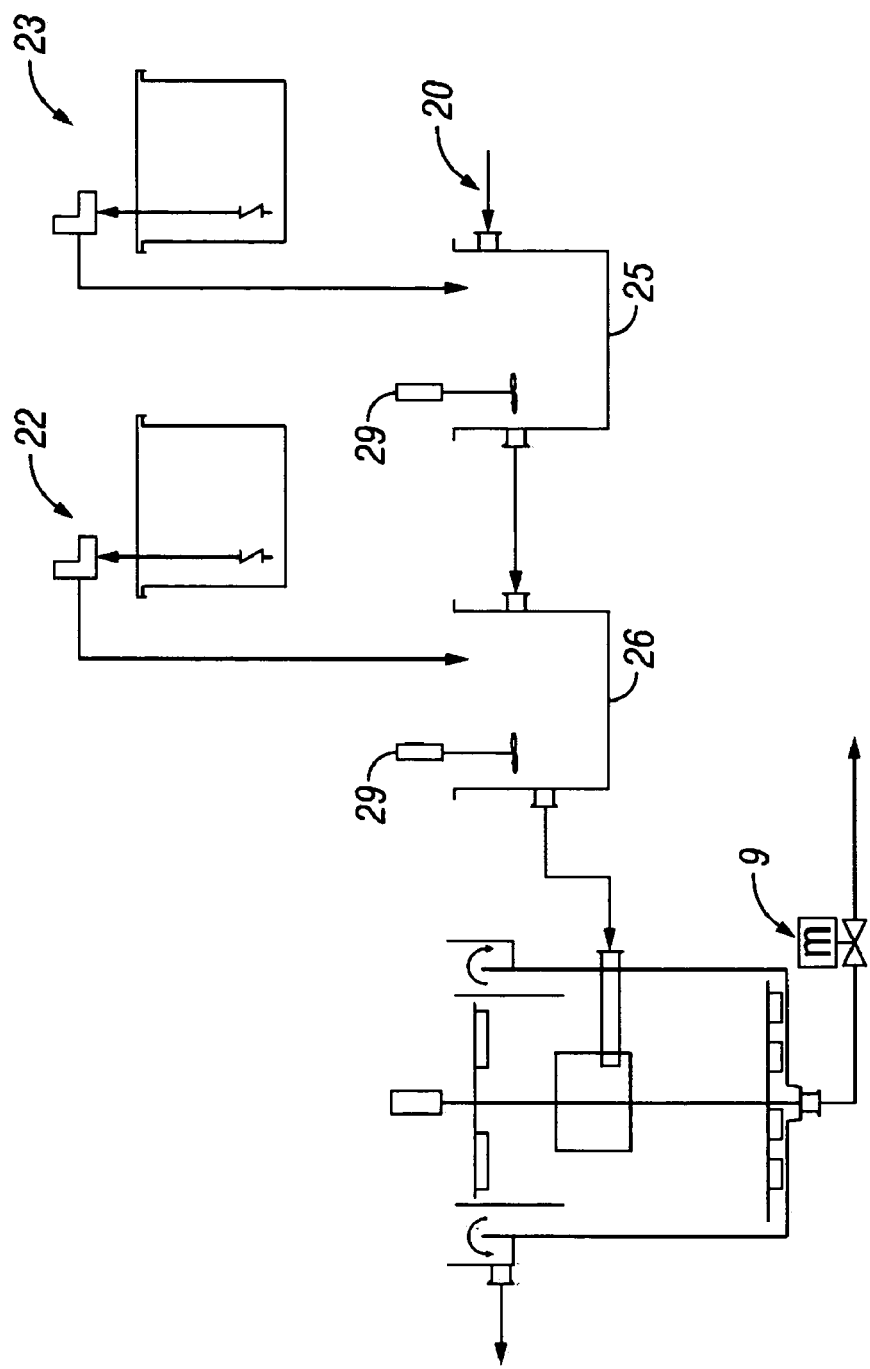
FIG. 3 is an illustration of an alternate embodiment of the present invention.

Now referring to FIG. 3, an alternate embodiment of the present invention, embodiments including chemical treatments of the wastewater are disclosed. Wastewater treated by various embodiments of the present invention may incorporate the addition of chemicals to aid in colloidal separation of the solids and dissolved solids, precipitation of dissolved solids, reduction of odor, conditioning, adjusting the pH, adjusting the electrolyte content, and the like of the wastewater. Various embodiments utilizing further chemical treatments may convey the wastewater along a path 20 into a tank 25. Tank 25 may include a mixer 29 or other device common in the art for circulating the wastewater. A treatment chemical may be added to tank 25 from a treatment chemical supply 23 or any other suitable source. Treatment chemical supply 23 may contain or comprise any chemical common in the art for treating wastewater, such as inorganic and organic conditioning agents and/or flocculating agents. Examples of such chemicals are common in the art and include, but are not limited to, aluminum chloride, ferric chloride, electrolytes, acids, bases, and the like. The use of such chemicals may improve the clarifier performance but are not required.

Various other embodiments of the present invention may utilize multiple treatments of wastewater with multiple chemicals in multiple tanks, such as tank 26 and chemical(s) 22. However, such other treatments are not required, but may be found to increase the waste removal from the wastewater. Such further chemical treatments may be employed in an environmentally sound manner such that the production of harmful products and is reduced.

Figure 4:
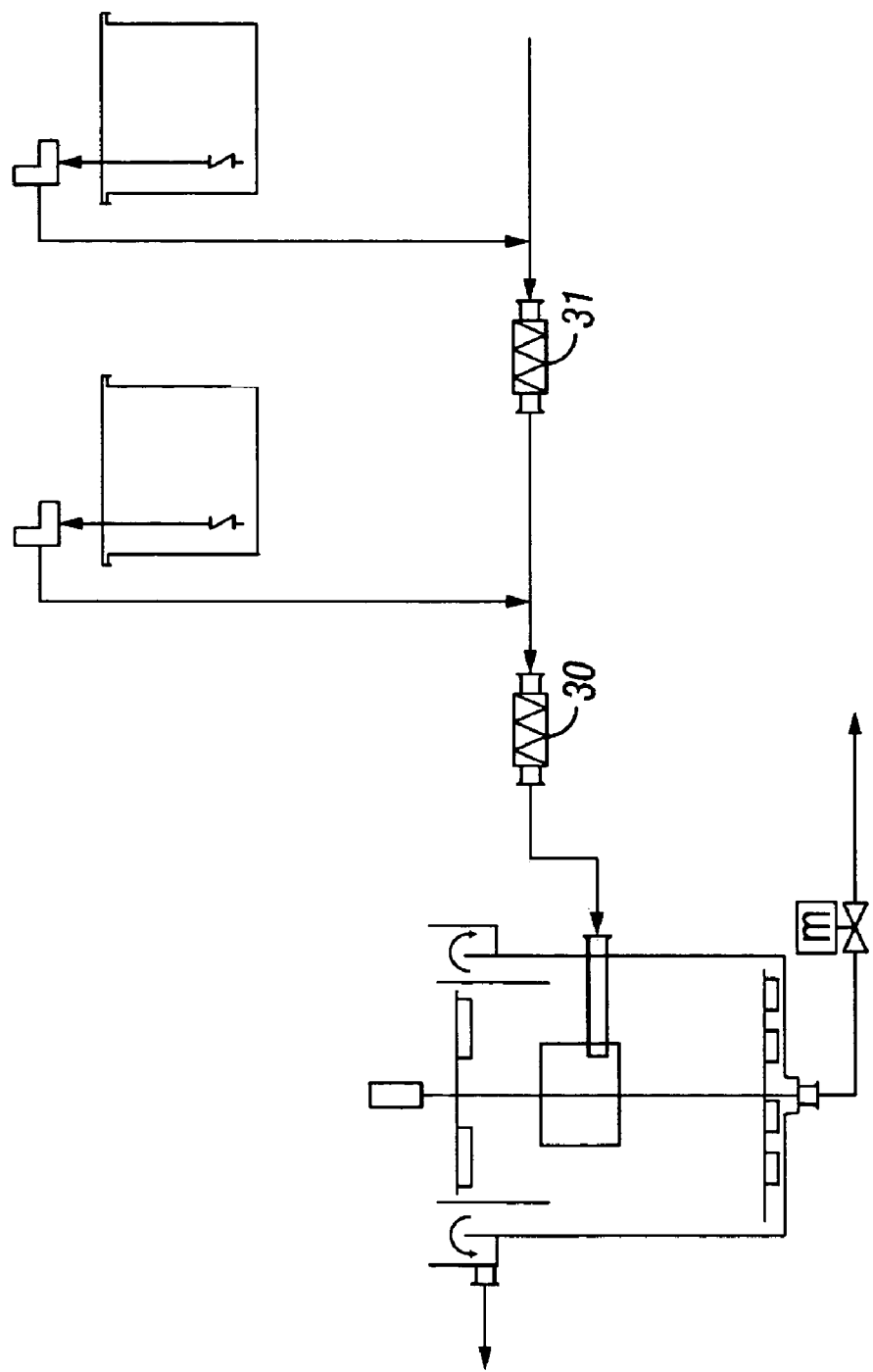
FIG. 4 is an illustration of an alternate embodiment of the present invention.

Now referring to FIG. 4, an illustration of an alternate embodiment, tanks for mixing of chemicals with the wastewater are not used. Mixing chamber 30 may be used to mix any utilized chemicals with the wastewater. Various embodiments may utilize any number of mixing chambers. In the illustrated embodiment, two mixing chambers 30 and 31 are connected in series. However, various other embodiments may utilize other combinations of mixing chambers in a variety of configurations including parallel and series configurations depending upon the application.

Figure 5:
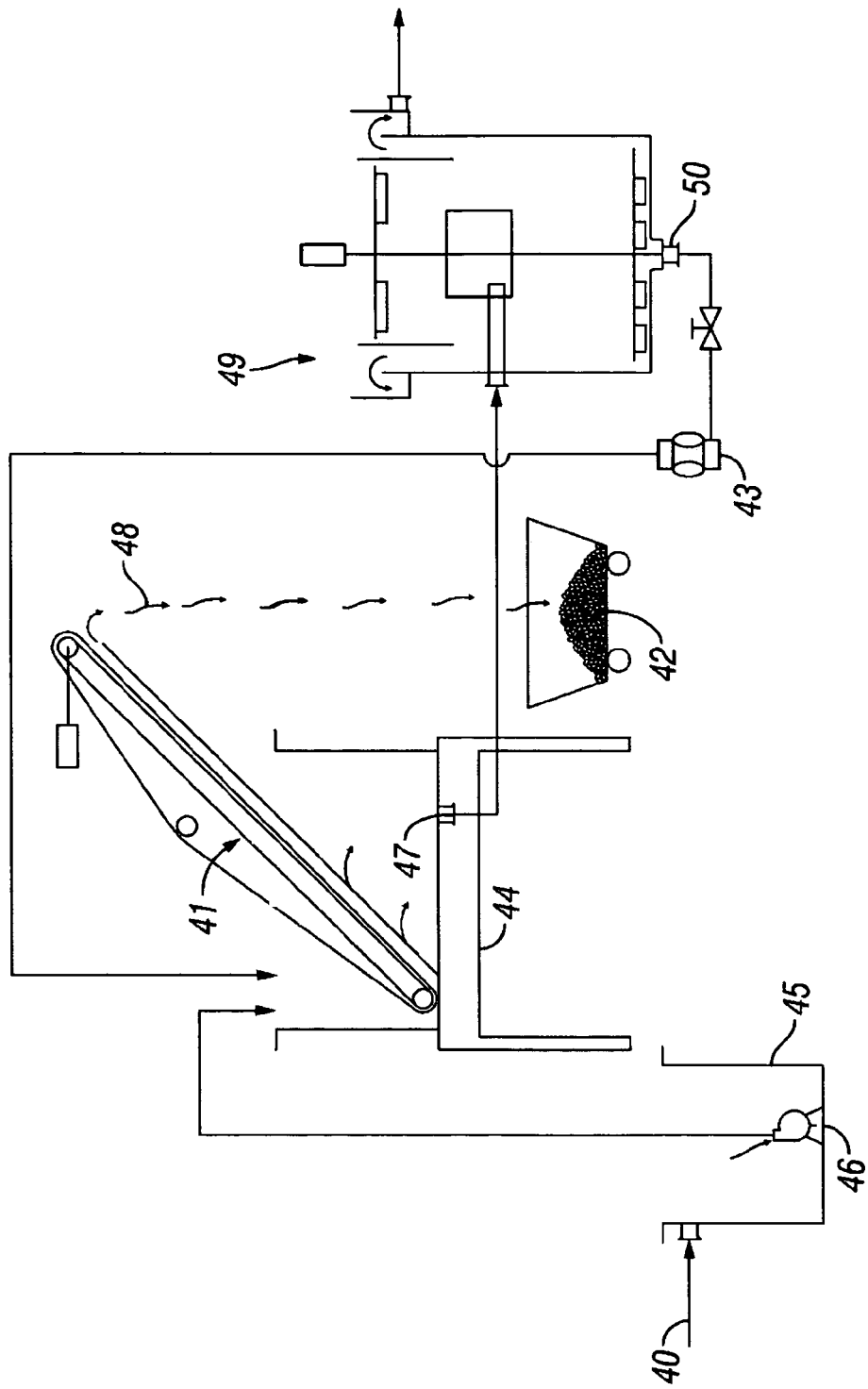
FIG. 5 is an illustration of an alternate embodiment of the present invention.

Now referring to FIG. 5, an alternate embodiment of the present invention, an embodiment is illustrated where the wastewater is pretreated before separation of the solids and dissolved solids. In an embodiment, wastewater is conveyed along a line or path 40 from a source, as heretofore described, into a tank 45. The wastewater may be treated for any desired effect or condition. In another embodiment, no pretreatment is performed and tank 45 may be a holding tank. After the wastewater is conveyed into tank 45 the wastewater is pumped by pump 46 or other similar methods or apparatuses into a tank 44. Tank 44 may have a separator screen device 41. As the wastewater is screened on separator screen device 41, a portion of the solid material 5 in the wastewater will be conveyed along device 41 and conveyed to a trolley 42 for disposal or further use. The liquid and solid matter remaining in tank 44 may be passed at an opening 47 to a clarifier 49 where the wastewater will have further solid and dissolved solid matter removed. As described before, the sludge collected along a portion of tank 49 may be passed at a location 50. In embodiments of this design, after the sludge is passed from tank 49 it may be pumped back into tank 44 to be removed about device 41. Other embodiments of this type may convey the sludge elsewhere for any use or purpose.

Figure 6:
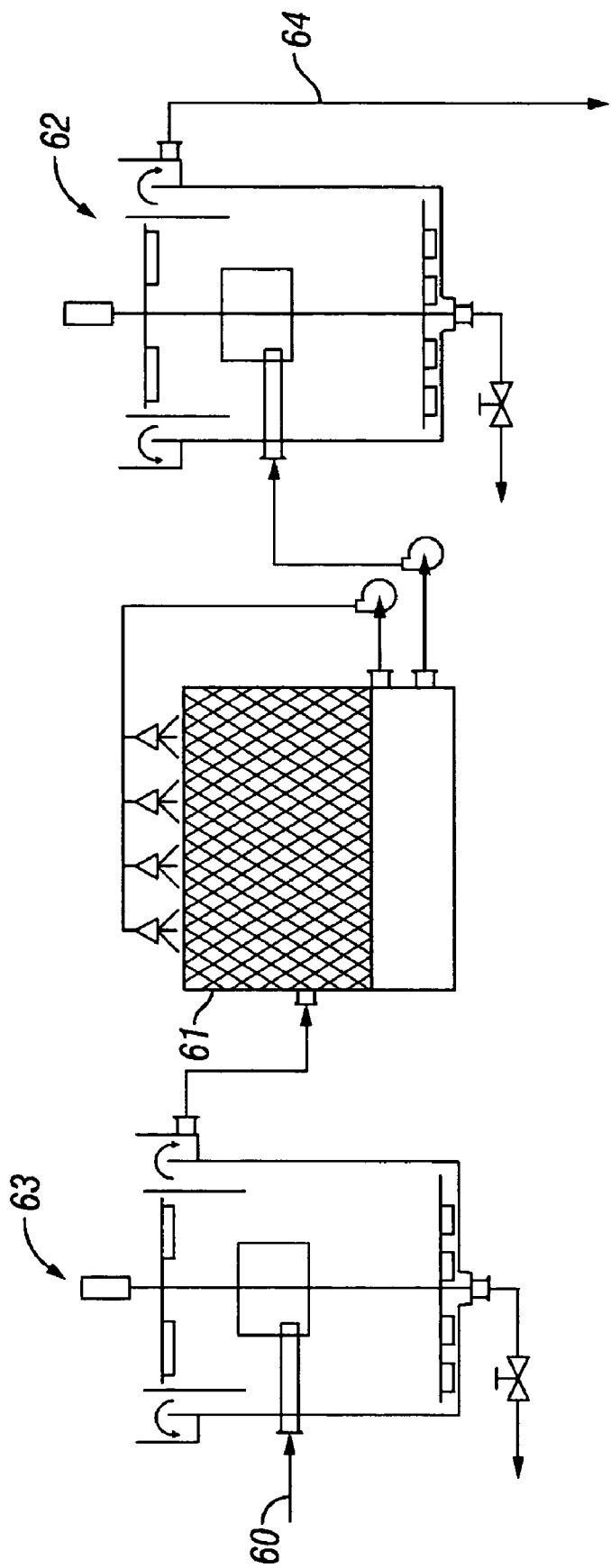
FIG. 6 is an illustration of an alternate embodiment of the present invention.

Now referring to FIG. 6, an alternate embodiment of the present invention, another embodiment of a clarifier system is disclosed. After the wastewater is screened, it may be conveyed along a path 60 to a clarifier 63. The clarified wastewater may then be passed into a bio-tower 61. For example, a Hoffland-Environmental Bio-tower. The bio-tower 61 acts as a trickling filter. Bio-tower 61 has a naturally occurring biomass culture adhering to walls within the tower. Convection of air about bio-tower 61 supports an aerobic culture and/or aerobic biological activity. As wastewater flows through the biomass, or media, a portion of soluble organic material in the wastewater is consumed. A second clarifier 62 may be used following bio-tower 61 for further clarification of wastewater. Other embodiments of this type utilize bio- tower 61 and clarifier 63 in alternate orders and in varying numbers.

Figure 7:
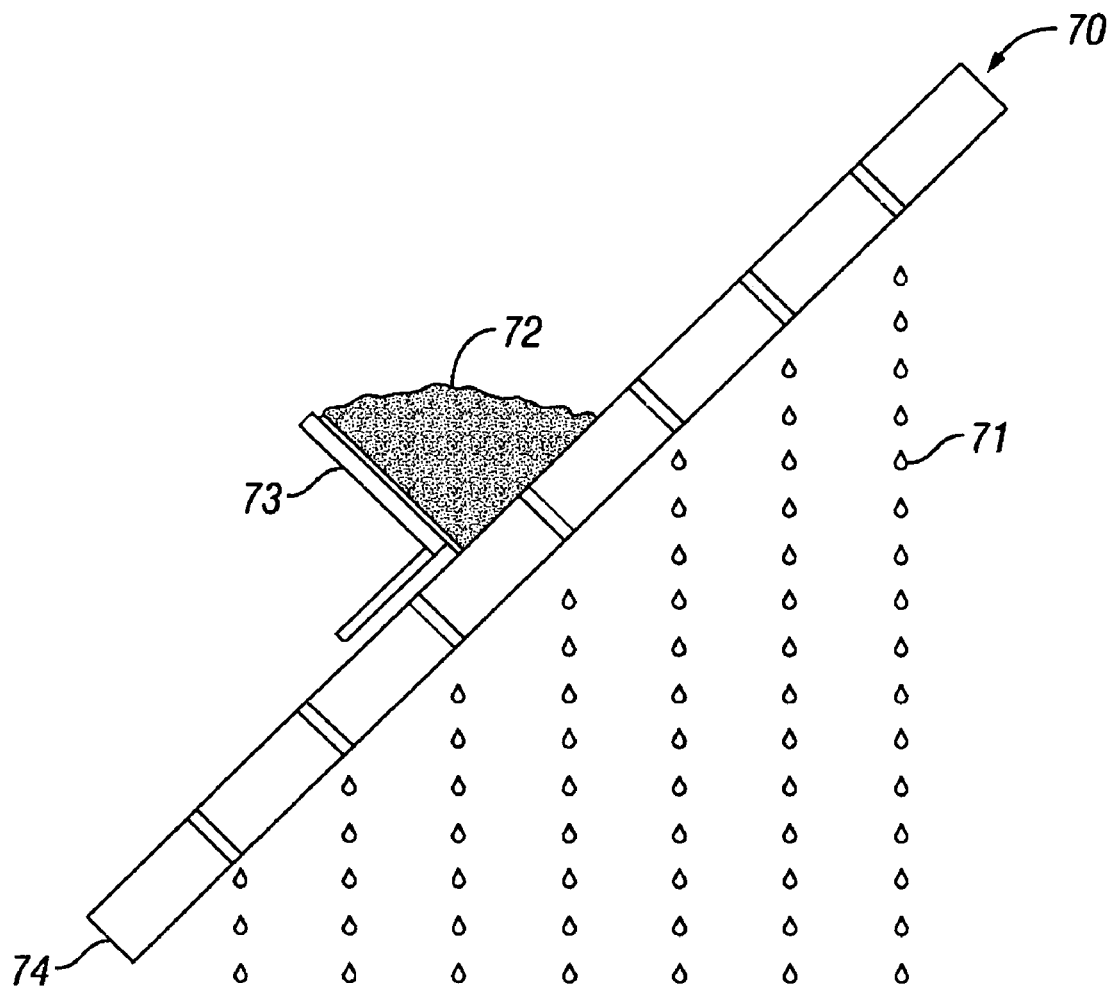
FIG. 7 is an illustration of a separator screen device of the present invention.

Now referring to FIG. 7, an alternate embodiment of a separator screen device is disclosed. Separator screen device 70 may generally be composed of a plane 74 and a drag chain 73. Waste solid particles 72 collected on a surface of plane 74 may be conveyed along plane 74 by a drag chain 73. A portion of a surface of plane 74 is porous such that liquid collected on a surface of plane 74 may pass through fall below. In an embodiment, a portion of the upper surface of plane 74 is porous. In another embodiment, the portion porous is the entire surface of plane 74. However, various other embodiments may utilize different structures to convey solid particles along plane 74 and will be readily apparent to those of ordinary skill in the art.

Figure 8:
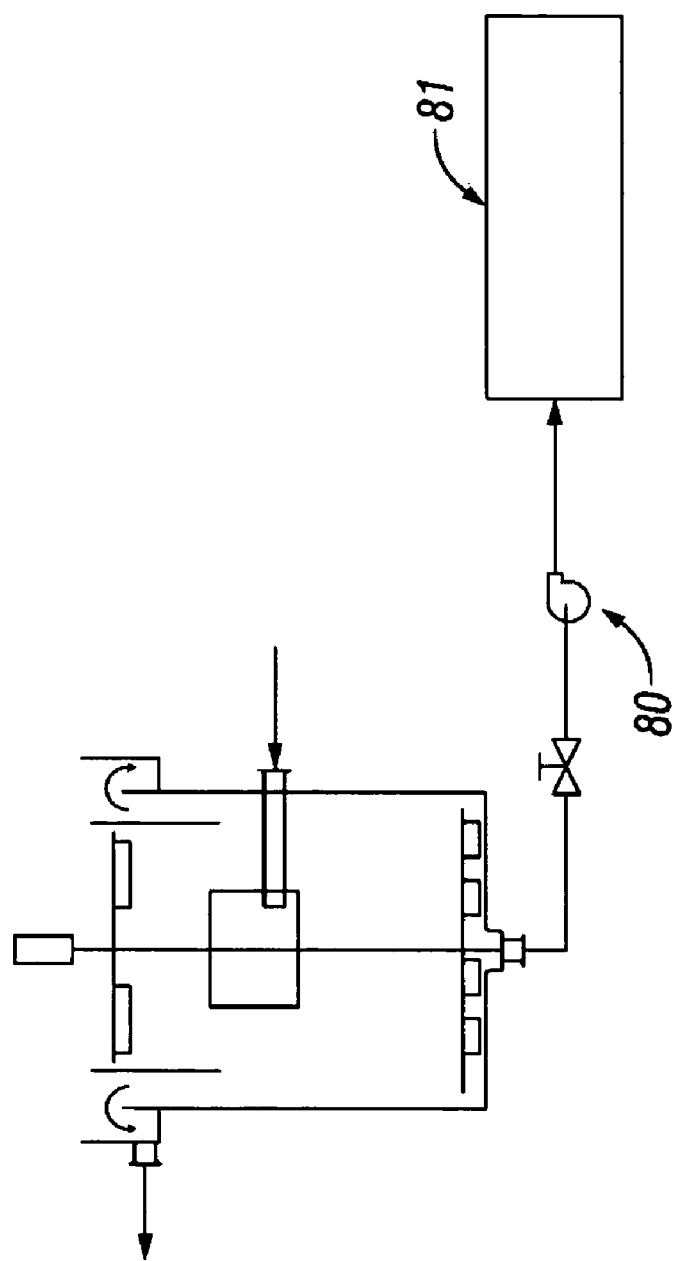
FIG. 8 is an illustration of an alternate embodiment of the present invention.

Now referring to FIG. 8, an alternate embodiment of the present invention is disclosed. Sludge collected from a portion of a clarifier may be conveyed and pumped by pump 80 into a solid compaction unit 81 for disposal or further use. Various other embodiments may compact the waste solids and sludge without the use of a pump.

Figure 9:
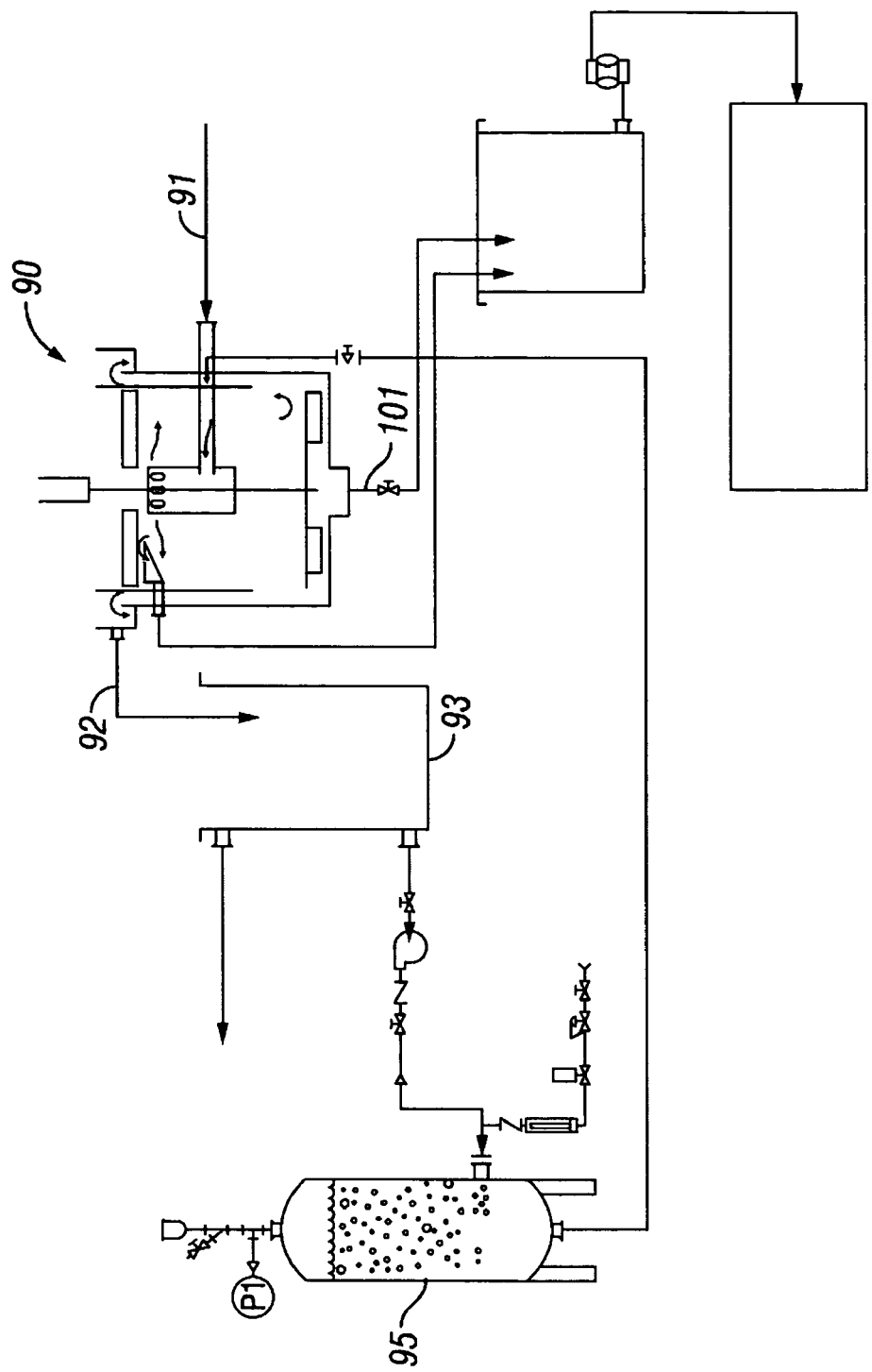
FIG. 9 is an illustration of an alternate embodiment of the present invention.

Now referring to FIG. 9, an alternate embodiment of the present invention is disclosed. FIG. 9 illustrates a gravity clarifier 90, tank 93, and dissolved air flotation system 95. In this embodiment, wastewater is conveyed through a port 91 into a gravity clarifier. A second solid material may be removed from about a portion of clarifier 90 at opening 101 and a portion of the wastewater will be conveyed along path 92 into tank 93. A portion of the wastewater conveyed into tank 93 will still have a portion of solids. The portion of solids in tank 93 is passed to a dissolved air flotation system for additional solid removal, while a portion of the wastewater in tank 93 will be conveyed to a lagoon or facultative pond. The wastewater in system 95 will be further separated, as is known in the art. Solid portions separated by system 95 may be conveyed to a trolley or disposed of in another manner. Liquid portions separated by system 95 may be conveyed back into a clarifier, screen, or facultative pond. However, various other arrangements and modifications incorporating the use of a dissolved air flotation system will readily apparent to those of ordinary skill in the art.

Figure 10:
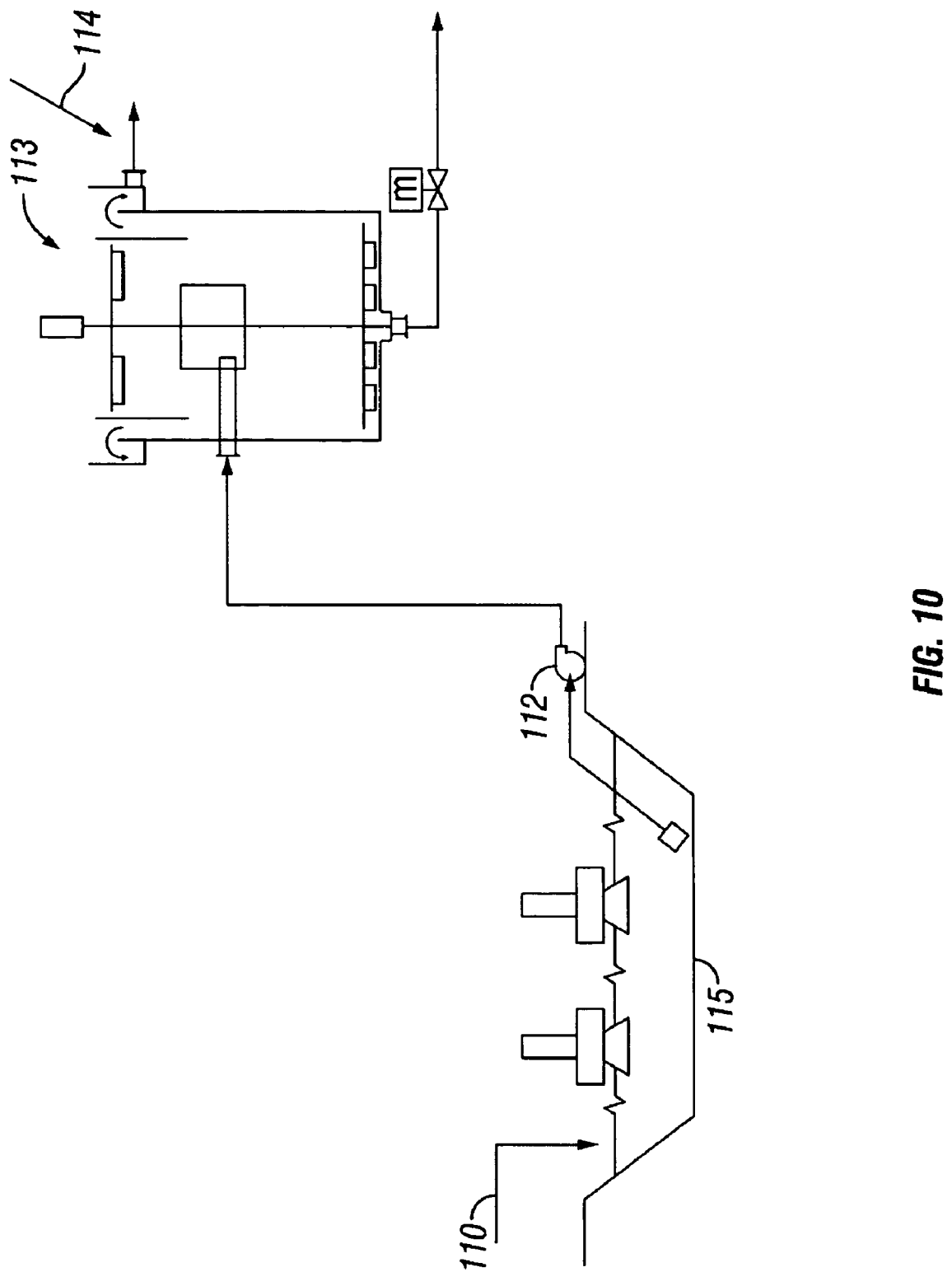
FIG. 10 is an illustration an embodiment of a denitrification system in use with embodiments of the present invention.

Now referring to FIG. 10, an embodiment of a de-nitrification system in use with embodiments of the present invention is disclosed. In addition to the various embodiments described above, wastewater may be further cleaned by de-nitrification. In an embodiment, wastewater from a clarifier or other treatment facility device and/or apparatus is conveyed along a path 110 to a tank 115. Tank 115 is equipped with at least one aeration system, constructed and fit in tank 115 as is common in the art. The aeration of tank 115 and wastewater will act to further decrease the amount of nitrogen present in the wastewater. The at least partially de-nitrified wastewater is then pumped, by pump 112 or similar device, to a clarifier 113. A clarified wastewater may be withdrawn about location 114 for further use or disposal.

Figure 11:
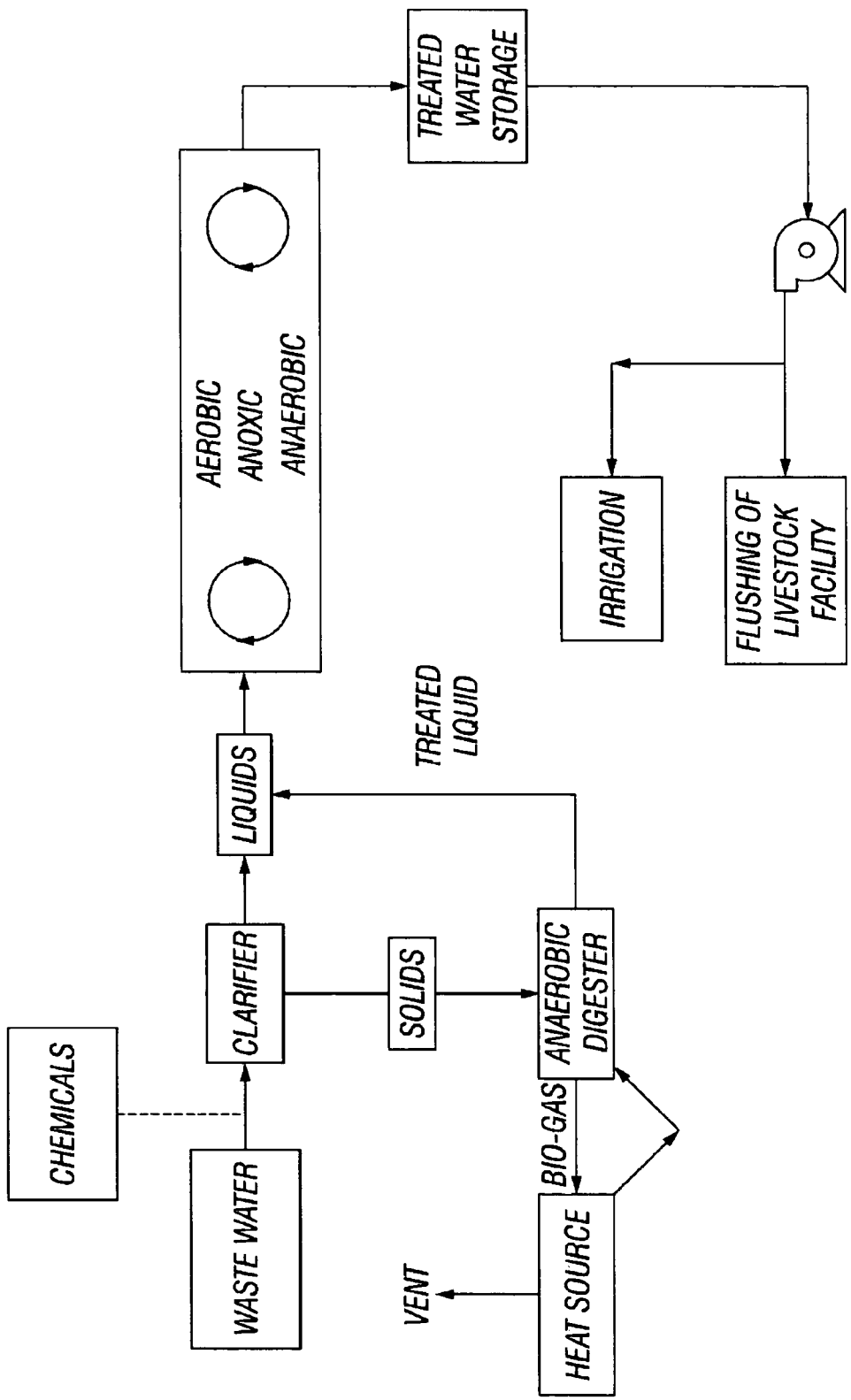
FIG. 11 is an illustration of an embodiment of the present invention.
Figure 15:
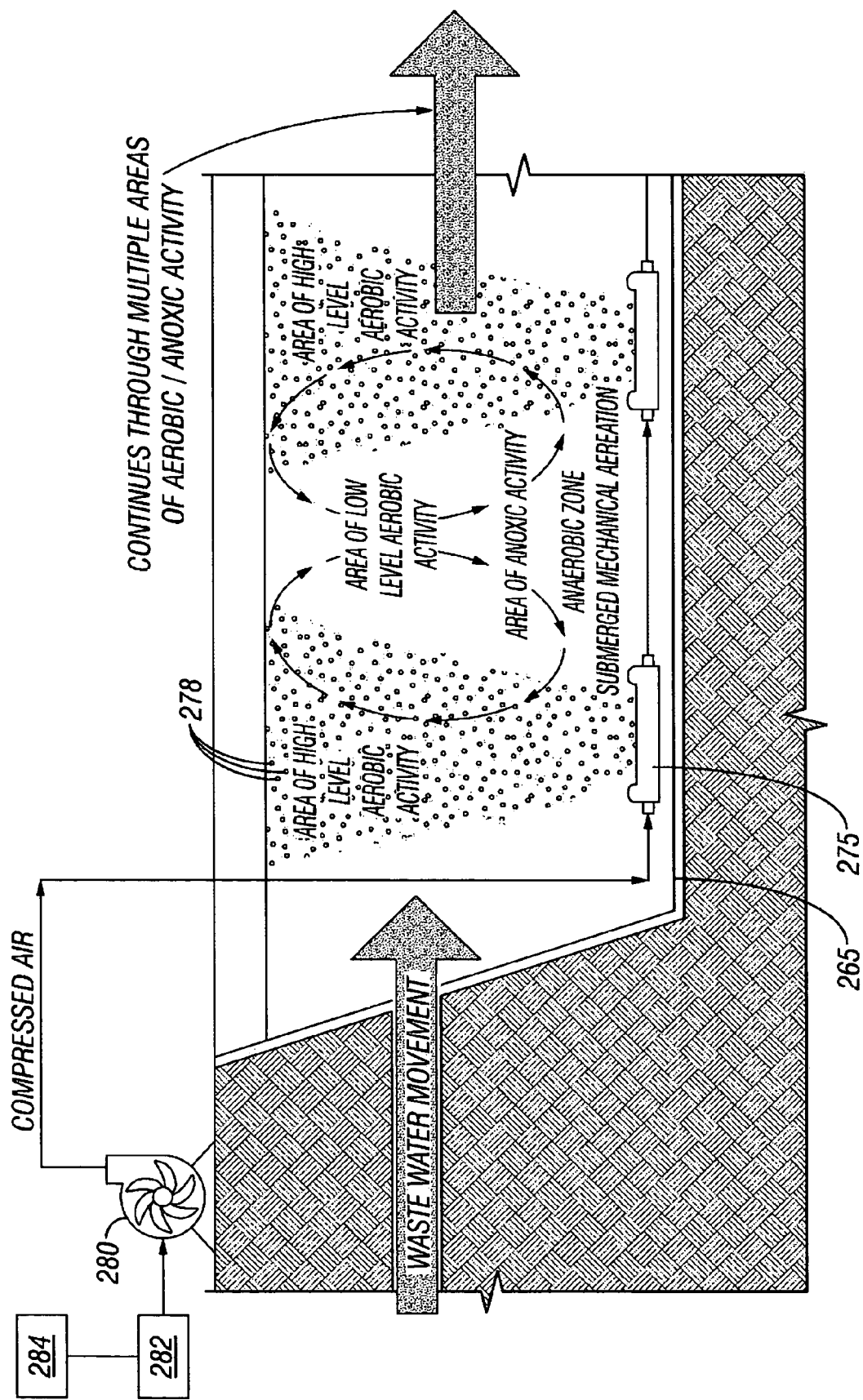
FIG. 15 is an illustration of an aspect of the present invention.
Figure 17:
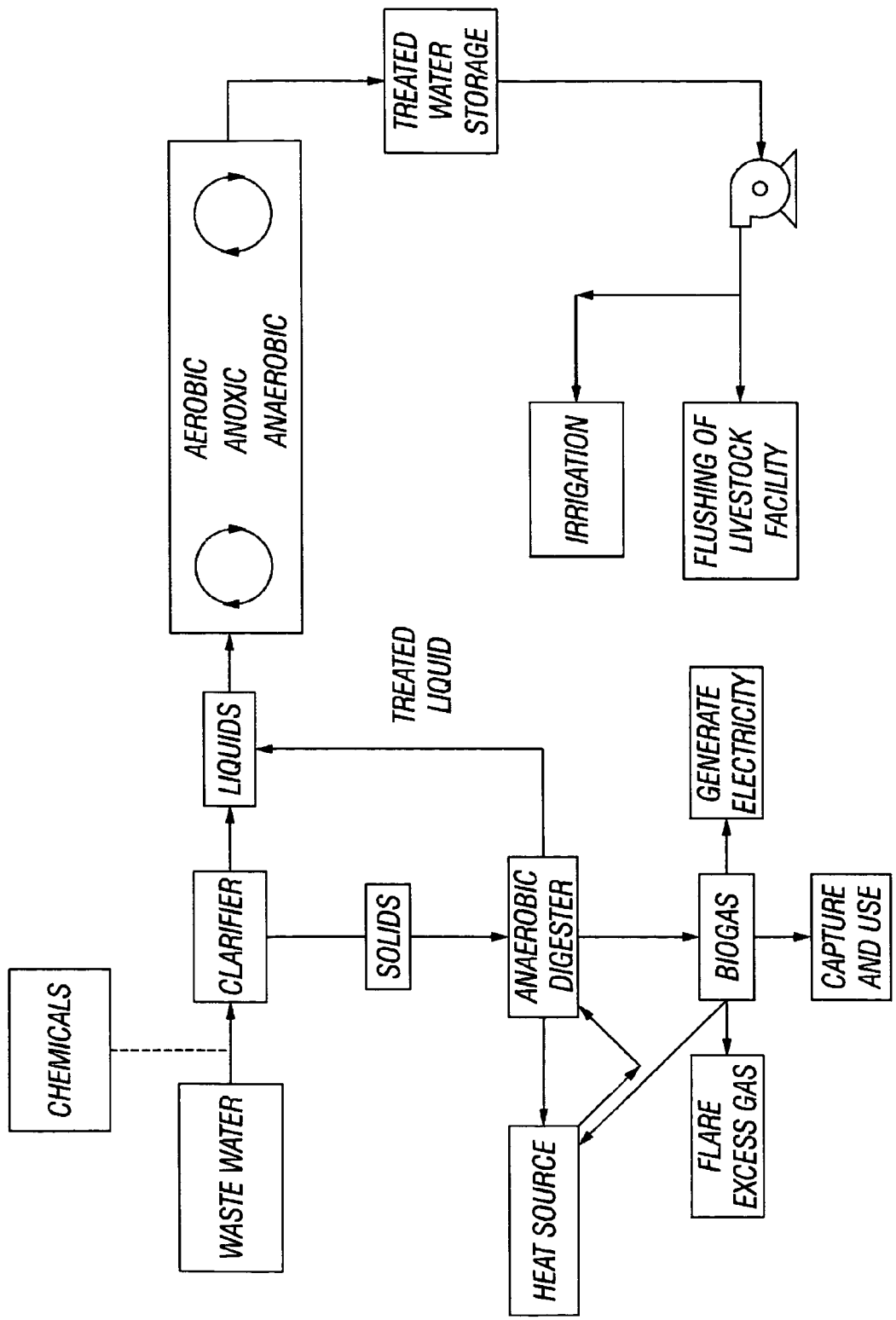
FIG. 17 is an illustration of an alternate embodiment of the present invention.
Figure 19:
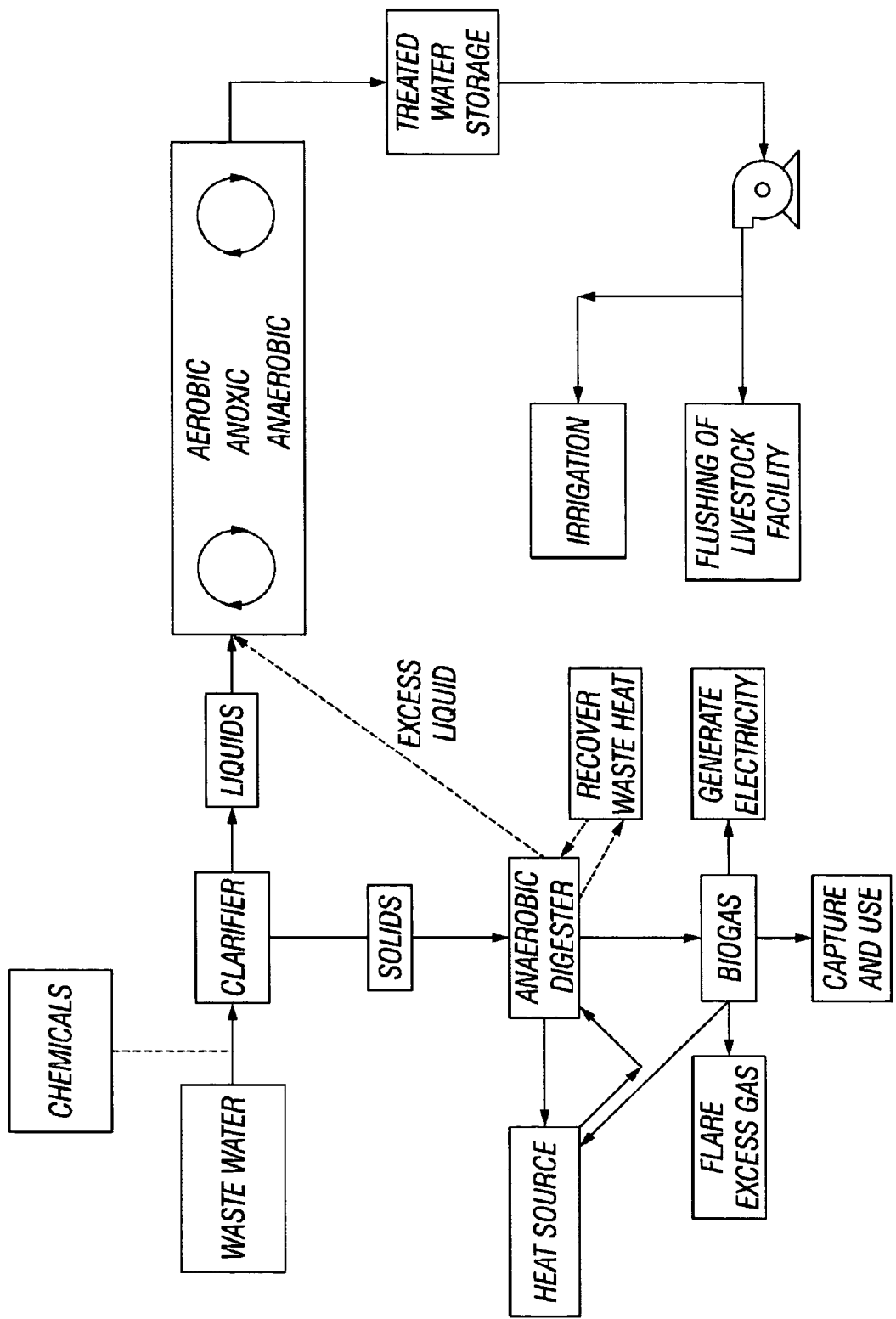
FIG. 19 is an illustration of an alternate embodiment of the present invention.

FIG. 11 is a flow chart that shows an overview of the method and apparatus of certain embodiments of the present invention. First, a source of wastewater containing biologic wastes, such as feces, nitrogenous waste and other organic and inorganic animal wastes are collected. Normally, the wastewater can be directly channeled into a clarifier that will separate the wastewater into a solids portion near the bottom of the clarifier and liquids portion near the top. The liquid portion is known as a clearwater portion and is comprised of at least nitrogenous waste, and possibly some biologic or carbon containing waste. The clearwater is then fed into a lagoon where it undergoes nitrification/de-nitrification and travels through various zones having different concentrations of oxygen. Different cultures thrive in different concentrations of oxygen and have different biologic action on the wastewater. Exogenous oxygen is preferably fed into the lagoon to make aerobic zones and the action of aeration will cause a convective flow around the oxygen source, such as that is shown in FIG. 15. As the distance away from the oxygen increases, zones will be of a lower oxygen content and will at some point turn into an anoxic zone, with a varying range of low oxygen content. Even further away from the oxygen containing zone will be an anaerobic zone, where there is virtually an absence of oxygen. Further, the convective flow will cause some mixing of the zones, so water will move from one zone to another. Once an appropriate level of nitrogen reduction and COD has been reached, the water can be removed for storage or for use, such as by irrigation and the flushing of a livestock facility, which also creates more wastewater. The solids portion (underflow from the clarifier) however is fed into an anaerobic digester that contains at least one culture of anaerobic bacteria. In the digester, the carbon content of the solids matter is greatly reduced. As a result, biogas is a metabolic by product and is comprised of at least methane, carbon dioxide, and hydrogen sulfide containing gases. In this invention, the biogas may either burned by a flare as it leaves the anaerobic digester to deodorize and detoxify the gas. Alternatively, a semi-permeable membrane may be used that allows for slow diffusion of the biogas through the membrane layer and subsequent oxidation and deodorization and neutralization of the biogas. However, more advantageously is to capture and use the biogas, for example to increase the temperature in the wastewater in the anaerobic digester that greatly increases the bacterial rate of reaction and metabolic processes. Additionally, extra biogas can be used to generate electricity and heat for a wide variety of uses. See e.g. FIGS. 17, 19, additional flowcharts. For example, FIG. 17 illustrates that the biogas can be burned as a flare, can be captured and used, can be used for a heat source for the anaerobic digester and/or to generate electricity. FIG. 19 illustrates that the biogas can be burned as a flare, can be captured and used, can be used for a heat source for the anaerobic digester and/or to generate electricity. Further, the waste heat from the generation of the electricity can be recovered and used to also head the anaerobic digester. Additionally, extra biogas can be compressed and stored. Residual heat or biogas could also be used to heat the hog house or other animal housing, such as in wintertime.

The present invention requires a wastewater source 1 that comprises animal feces with at least one organic carbon component at least a portion of which is an insoluble solid and a nitrogenous waste, and a clarifier 216. See FIGS. 11-19. The wastewater may come from any source. Examples of sources include, but are not limited to, livestock production facilities such as: cattle, swine, goat, sheep, horse and the like, chicken ranches, duck farms, geese farms, human waste, and the like. Clarifier 216 may be of any size dependent on several factors, including, but not limited to, the volume of wastewater treated, the available space, cost variations between the size of device, and the like. As shown in FIG. 11, chemicals such as coagulating agents may be added to the wastewater before the wastewater is fed into the clarifier.

If there is a large volume of wastes that exceed the size of the clarifier(s) such as in plug drain operations, various embodiments will use a storage tank or holding pit, or other suitable substitutes (not shown).

In the following embodiments, it is not necessary to use a screen because if the waste coming to the settling device, clarifier or anaerobic digester unless it has large trash or debris e.g. in excess of 1-2 cm (which may impair the operation of a pump). Instead, the flushed waste can go directly to the clarifier. If desired, the material coming off the bottom of the clarifier now can also be further compacted in any device such as an incline screen, a screw press, a filter press, a centrifuge or a bell press (not shown). These are devices common to the art.

Where the solids are decomposed with an anaerobic digester, e.g. 245, 246 in FIGS. 12-14, 16, 18 a clarifier 216 is used to concentrate the waste to feed to the anaerobic digester. If the wastes are collected and put into a clarifier first, the waste can be concentrated about 4-15 times and preferably at least about 10 times in terms of solids to liquids that comprise insoluble solids and undissolved soluble solids portions. Thus, there is about 6%-10% by weight concentration of material going in through it instead of about 1%. The limitation on the amount of solids concentration is that the solids portion still must be capable of flowing through the piping or conduits that lead to the anaerobic digester. This is significant because the size of the digester gets to be about $\frac{1}{10}$ the size, or about the fractional equivalent of the concentration, and reduces the cost and the space requirements significantly with respect to the anaerobic digester. In contrast, if 100%, or substantially all of the waste is directed to the digester, it will require a very large system for commercial type operations that often requires about 6 months retention time, and acres and acres of storage.

When the wastes are separated and the solids are concentrated, the clearwater portion 202a of the wastewater from the clarifier goes to the aerobic basin, and is further treated. Also after anaerobic digestion, the water from the covered anaerobic reactor goes to the aerobic basin and is further treated. Wastewater is conveyed to a clarifier 216 through an inlet in the clarifier 215, and an inlet still well 213. The clarifier has a top edge 220 and a bottom area 226. The clarifier 216 clarifies the wastewater to at least partially separate the wastewater into a clearwater 202a portion at or near the top edge of the clarifier and wherein the solids are at least partially concentrated into a solids portion 202b at or near the bottom 228 of the clarifier. Clearwater is defined as water that may or may not have discoloration, and has low turbidity, and does not have visible particulate matter. The primary clarifier 216 may have a sloped bottom to enhance solids removal and/or it may have a rake 218 that turns the material into the center to assist in the separation of the solids and the liquid wastewater 202. See FIGS. 12, 14. Typically near the top of the clarifier is a weir 222 to prevent any unseparated solids portion from overflowing the clarifier and from prematurely entering the oxidation lagoon As wastewater is treated in clarifier 216 a portion of the solids material may be removed from the wastewater such that wastewater may be further cleaned and the solid particles and dissolved particle content reduced. In an embodiment, clarified wastewater or clearwater portion is allowed to exit clarifier 216 about an opening 217. The clarified clear wastewater is preferably conveyed to a lagoon, holding pond, facultative pond, or other structure for further treatment. Various methods of collection and removal of clarified wastewater from clarifier 216 may be used and are well known in the art.

The clearwater exits an outlet 224 near the top of the clarifier and then travels through a conduit to the aerobic basin 265 for nitrification and/or denitrification and/or a biological reduction of carbon. The conduit may be open or closed and comprised of a variety of materials known or used by one skilled in the art, such as a 6 inch schedule 40 PVC pipe.

At or near the bottom 228 of the clarifier is an outlet that channels the solids portion 202b into a solids conduit 234 that preferably has at least one bypass circuit 236 in the event the conduit becomes clogged. There may also be various valves 240 within the conduits to turn on and off the flow of the solids portion. The solids portion is then channeled to a anaerobic digester 245. Because much of the wastewater is separated and fed directly into the lagoon 265, the size of the anaerobic digester may be decreased from that typically used in wastewater treatment.

The clarifier can be a conventional clarifier manufactured by Hoffland Environmental Model No. 8/3000 the clarified water flows into the aerobic basin into the aerobic basin and the underflow that contains the solid slurry exits the clarifier at or near the bottom end through a valve. A variety of types of valves known to one skilled in the art may be used, such as a motorized ball valve manufactured by Hayward. The solids then flow into the covered anaerobic digester. The bottom outlet of the clarifier is ideally attached to a about 4 inch to about a 12 inch pipe, and preferably a 6 inch pipe which is the most economical pipe to use that will resist clogging.

Conduits, pipes, trenches, and the like connect the various components of the apparatus of this invention. The type of connection and conduits depend upon a variety of factors, for example, the need to prevent the escape of biogas, odors, and the desire to prevent the loss of heat.

Waste from cattle is different from that of hogs and is treated differently. The hay that is ingested is a cellulose material is chewed up so finely that it becomes like a paper waste. Cow waste is very dilute, and contains a lot of water. So if the wastes are flushed, as they do on the farms in the eastern part of the U.S., a very dilute solution of the dairy waste is obtained. If clarification is used, it takes it a very large settling tank, and even after it is settled and concentrated, the wastes are very dilute—only about 6%. So, it is more efficient to put the wastes directly into an anaerobic digester. Further, it is more efficient to scrape the wastes, such as by a tractor, and to pump the wastes into the anaerobic digester and it is already concentrated.

The anaerobic digester 245 reduces the volume of organic mass because the organic material in the solids is decomposed by bacterial action, so essentially up to about 90% of the carbon containing material will be biologically consumed by the microbe growth. As a result, biogas is produced which is about 60% methane and about 40% carbon dioxide and trace amounts of other gases such as hydrogen sulfide. Still, some undesirable septic odors can come off from the digested liquid from the anaerobic digester that has overflowed into the aerobic basin. The digester contains at least one anaerobic cultures of obliquely anaerobic organisms, wherein the culture reduces the organic content of the solids portion and produces a biogas comprised of methane and/or carbon dioxide and/or hydrogen sulfide. An anaerobic digester is capable of reducing the carbon matter, and removing or degrading the solids. Treated liquid 249 from the anaerobic digester flows into the aerobic digester as new waste is put in the anaerobic digester, periodically or continually, and there is a certain amount of overflow.

The anaerobic digester is most preferably covered because methane gas, or biogas is produced and comes off the digester. If the anaerobic digester is not an enclosed vessel such as a tank, the surface of the anaerobic digester can be covered. The type of material chosen for the cover depends upon whether capture of the biogas is desired. If so, a non-permeable type continuous cover should be used. Alternatively, a semi-permeable membrane may be used which allows the biogas 260 and water vapor 262 to come up through the membrane and to be vented. The cover will float as it has styrofoam floats 254 underneath it. If the digester is in a pit or reservoir it typically has a lining 247 that prevents leakage and escape of the water portion of the solids. Again, as a by-product of microbial degradation, hydrogen sulfide normally comes up through permeable or semi-permeable covers.

Figure 12:
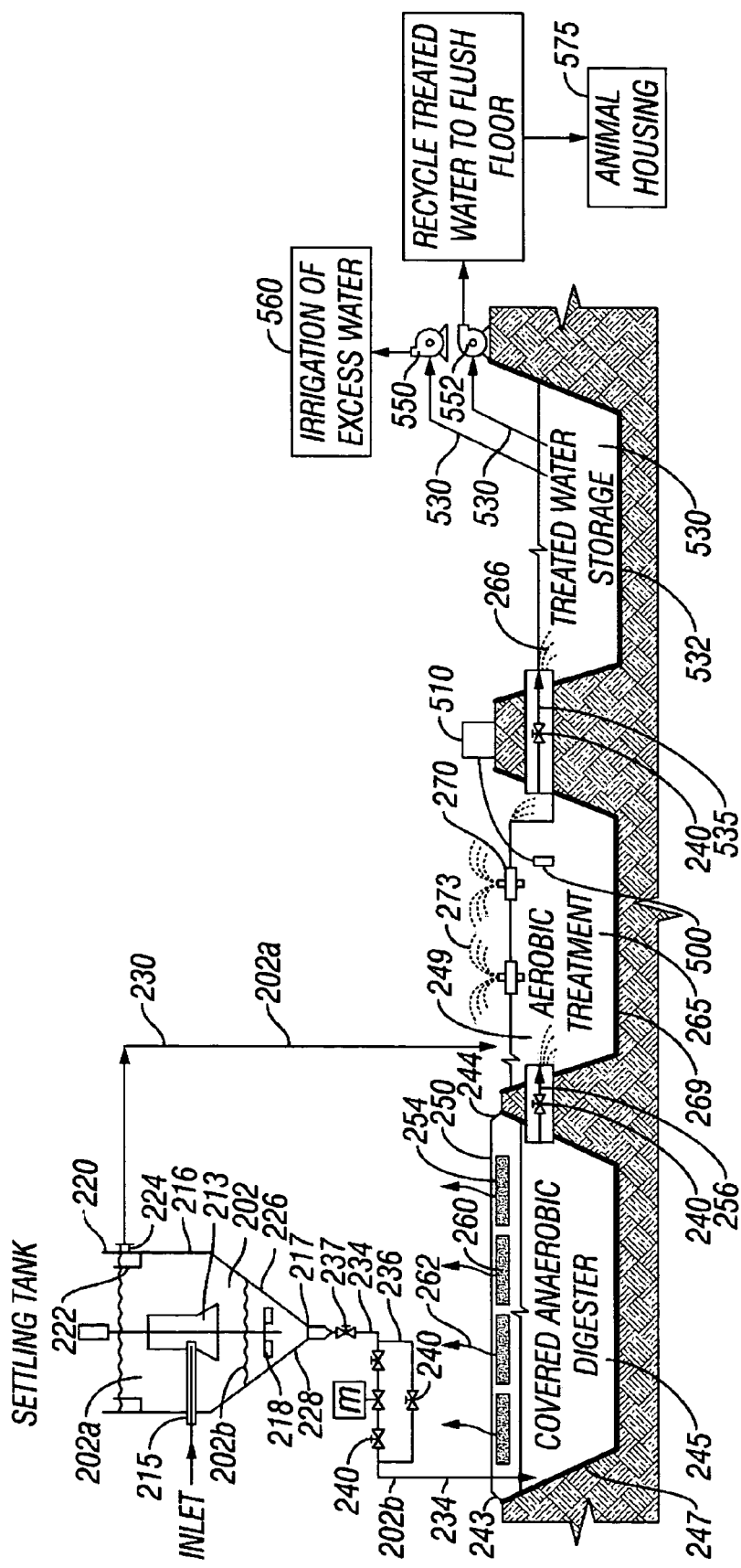
FIG. 12 is an illustration of an embodiment of the present invention.

If a semi-permeable membrane is used as in FIG. 12, it is preferable to use one that allows for slow diffusion of gases, and/or one that has specifically cultured bacteria that assist in the degradation of the biogas and oxidation of the biogas. The semi-permeable cover may be comprised of woven material, spun fibers, melted and blown films that are semi-permeable, and a variety of such materials known to one skilled in the art. Ideally, it is also ultraviolet resistant, and is preferably comprised of synthetic polymer material, such as polyethylene, polypropylene any type of ultraviolet resistant non-biodegradable material. The fibers will preferably be coarse fiber. The membrane may be of various thickness depending upon a variety of factors and may be less than 1/16 of an inch and up to about 1/4 of an inch or more. One such cover is about 1/16 inch polyethylene that is woven material, such as that made by Polyflex out of Grand Prairie, Tex. The preferred semi-permeable cover also includes cultures of the Thiobacillus genus to provide a strong oxidizing system on the floating cover. Further, the semi-permeable covering retains the gases so that they come out slow and in the aerobic conditions through the membrane and above the membrane, which at least partially oxidizes and deodorizes the hydrogen sulfide before it is released into the atmosphere. Biodegradation of noxious sulfur containing gas such as hydrogen sulfide is accomplished with autotrophic microbes of the *Thiobacillus* genus, which readily oxidize sulfide to sulfate.

Figure 13:
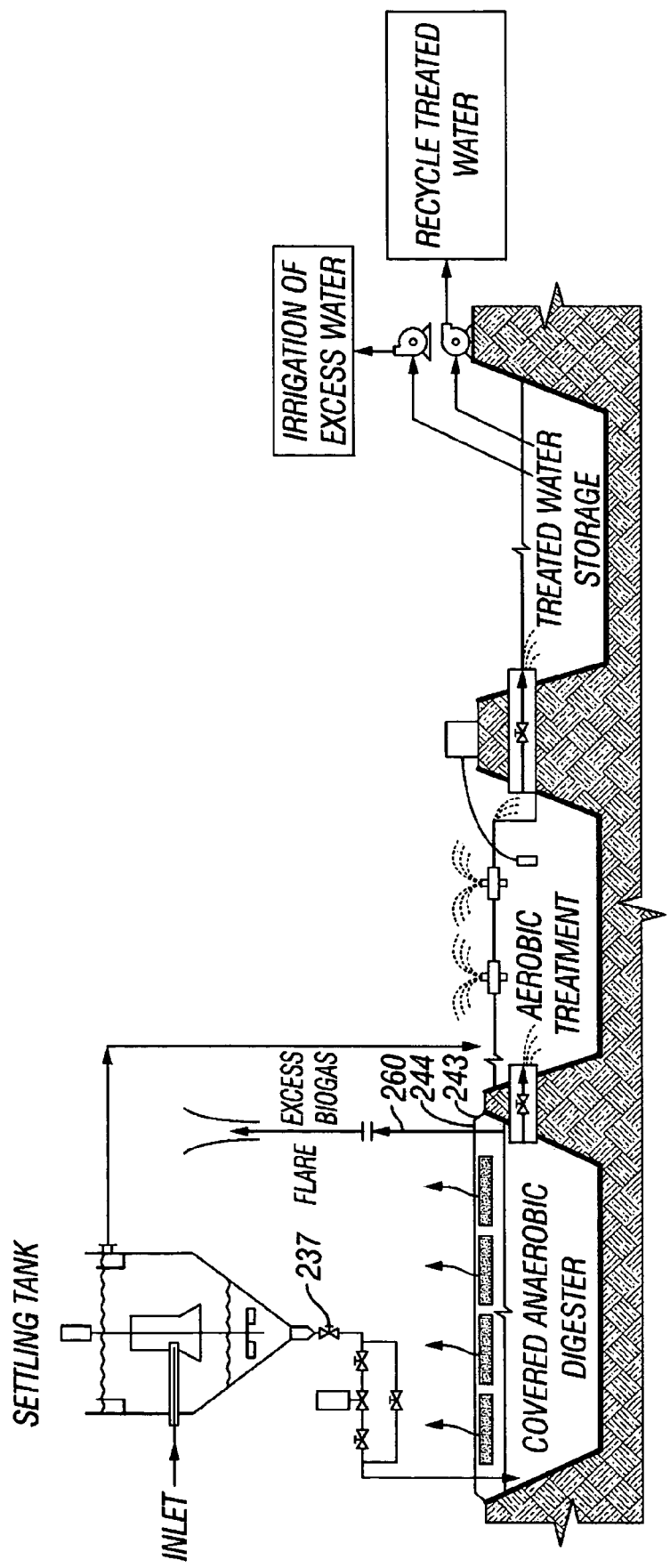
FIG. 13 is an illustration of an alternate embodiment of the present invention.

FIG. 13 shows an alternative embodiment of the method and apparatus of the invention. In FIG. 13, the covered anaerobic digester, a nonpermeable membrane cover is preferably placed around the top 244 and sides 243 of the reservoir, so that there is no unwanted escape of biogas from the digester. The biogas that is being produced will be burned via a constant or nearly constant flare to eliminate any of the odors rather than use it for recovering the heat. Biogas will burn in its produced form, but may also be separated and/or purified. Also, in another type of covered anaerobic digester such as a tank, a flare can also be used to burn the excess biogas. Further, when gas is produced, the membrane will be raised or lifted and will allow for collection and removal of the gas (not shown). It may be advantageous to have a permanently raised area, such as supported by a frame in order for the gas collection outlet to stay out of the wastewater (not shown). A variety of methods and apparatus can be used to collect the gas. A low pressure check valve or other type of valve, which may be manually or automatically operated, can be used. A low-pressure vacuum line may be attached and the collected gas is ideally compressed for storage or use. The degree of compression will vary upon storage capabilities.

Prior to storage, and it is preferable to purify the gas to remove the sulfides and other odiferous gases. The biogas could be purified by any means known and used by one skilled in the art such as by using an air separation unit, or separating gas comprising methane from the biogas by using a semi-permeable membrane. Molecular sieves can also be used to increase the concentration of the methane once it is purified it can be put in a pipeline or storage vessel The biogas is a low BTU value of gas, it is not as good as methane because it is 40% carbon dioxide, but it will still burn and can be used as a heat an energy source. Other methods and apparatuses for collecting and storing gases, as well as separating the gases that are known to one skilled in the art may also be used.

FIG. 17, shows the use an above grade tank for a covered anaerobic digester basin. An above grade tank will function as well as a below grade covered basin same process.

The covered anaerobic digester will usually have a 100 days retention time, if it is a mesophilic digester, it may be anywhere from five days to 100 days retention, if it is an ambient it will be about 4 months to 6 months to a year retention. The optimal temperature range for mesophilic digesters, and mesophilic bacteria are temperatures about 80° F. to about 100° F., with 95° F./35° C. being most optimum. Below about 95° F., the action of the digester is slower. The anaerobic digester in FIG. 18 incorporates the use of an engine driving an electric generator to utilize the biogas producing electricity. The biogas is collected under a nonpermeable membrane, which may be constructed of about 0.040 inch to about 0.060 inch high density ultraviolet resistant polyethylene manufactured by Polyflex. The biogas is sent through the engine in piping and that may be comprised of a variety of materials and sizes known or used by one skilled in the art. In an embodiment, aluminum, stainless steel, or plastic 6 inch pipes are used.

The gas is pressurized with a low-pressure blower such as Fujic Model VFC 200 p-51 to supply the biogas to the engine. For a swine operation with 1000 sows, farrow to finish a typical installation would include a 130 KW generator using a Caterpillar Model G-3406 HCNA engine with an induction generator. The unit will be equipped with a heat exchanger to receive the engine cooling water. The heat exchanger may be either a shell and tube style heat exchanger or a plate-to-plate heat exchanger such as Alp Laval model M6-MF6. The wastes from the anaerobic digester will be pumped through the cooling side of the heat exchanger. The engine exhaust may also be captured using a gas to liquid heat exchanger. The exhaust gas will be on the gas side of the exchanger and the anaerobic digester liquid will be pumped through the liquid side of the exchanger. The exhaust and/or excess heat are vented 365 from the exchanger into the atmosphere.

The heated wastewater 425 exciting the heat exchanger 340 is preferably conveyed back to the anaerobic digester through pipes 427 that are insulated, and that may be comprised of a variety of materials and sizes known or used by one skilled in the art. In an embodiment, carbon steel or stainless steel 6 inch pipes are used.

Figure 14:
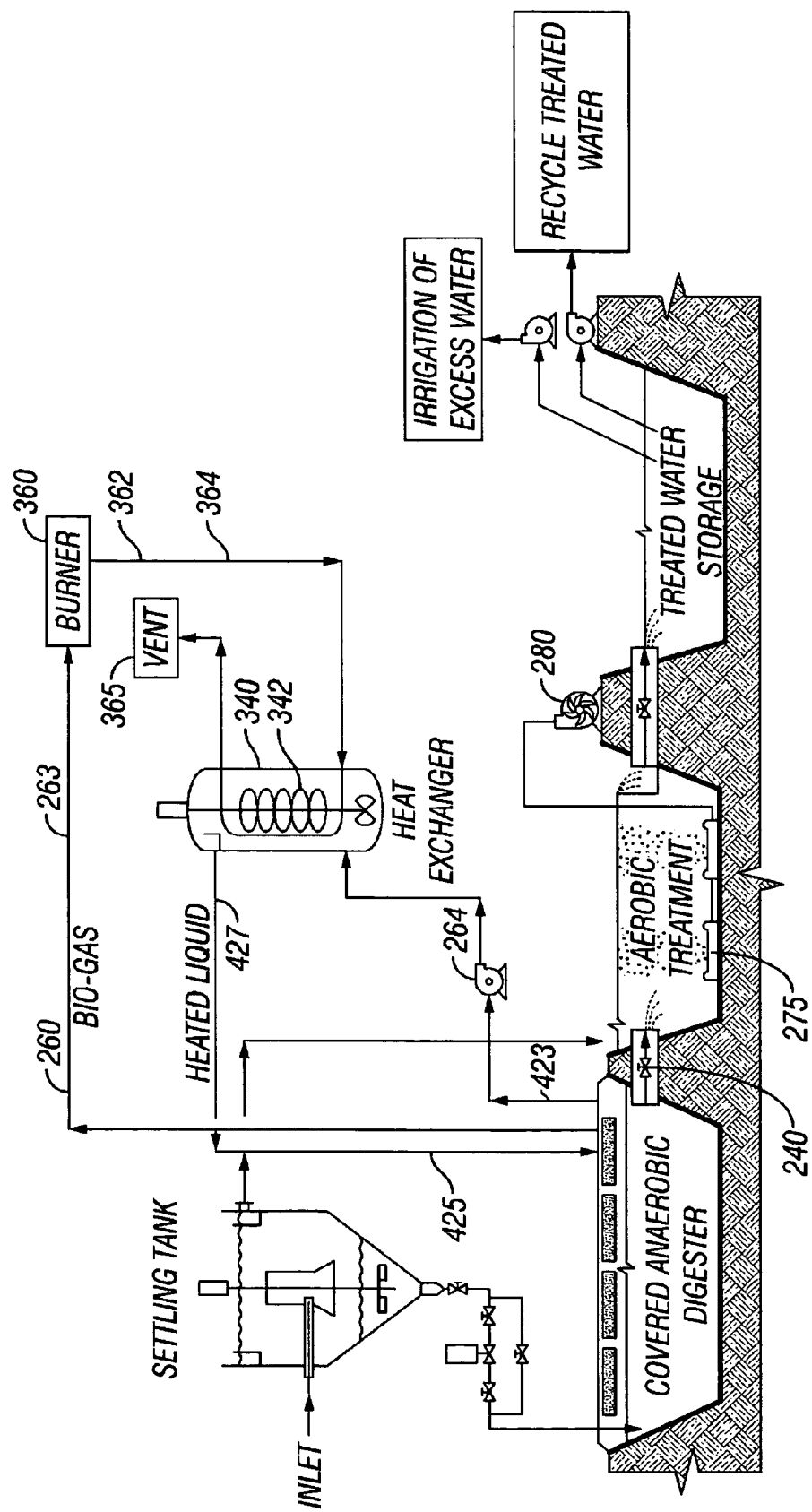
FIG. 14 is an illustration of an alternate embodiment of the present invention.
Figure 16:
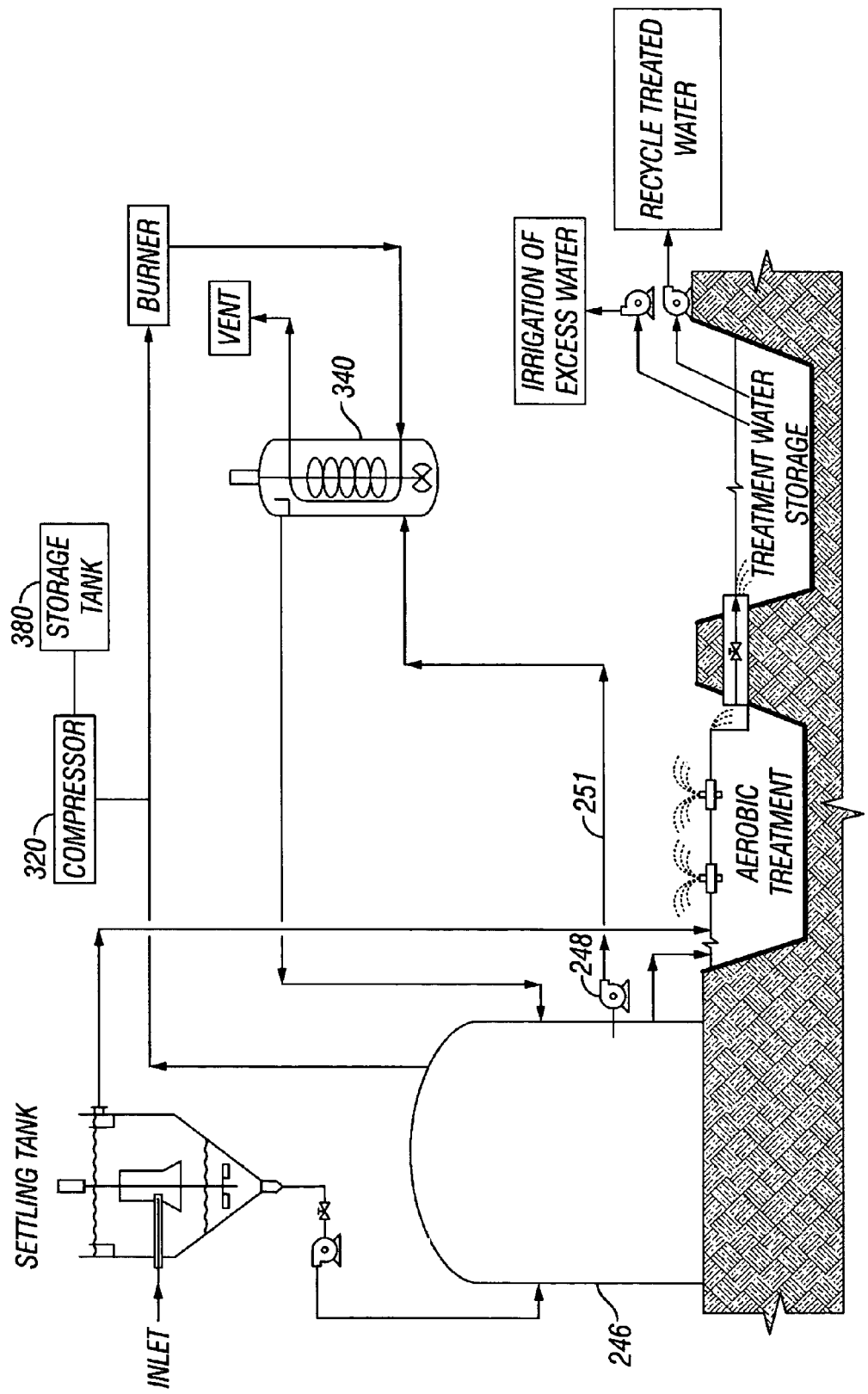
FIG. 16 is an illustration of an alternate embodiment of the present invention.

The anaerobic digester of FIG. 14 is covered by a non-permeable membrane that allows for the capture of biogas that is then fed into a burner. The anaerobic digester of FIG. 16 is covered by a non-permeable membrane that allows for the capture of biogas that is then fed into a burner. FIG. 16 depicts a further embodiment of the apparatus and method of the invention. The covered anaerobic digester, comprises an above grade tank 246. The produced biogas is captured such as by a valve and a plastic or stainless steel line and may be compressed by a low-pressure compressor, such as 320, and then stored in a low-pressure tank 380. As shown in FIGS. 14, 16, and 17, at least a portion of the biogas will be fed to a burner where it is burned to produce and heat that is directed to a heat exchanger tank filled with water from an outlet line 251 from the anaerobic digester. The water is heated in the tank and then returned through a conduit back to the anaerobic digester. A low-pressure pump 248, is preferably used to fill the tank with the coil. The heated exhaust is vented into the atmosphere.

The burner 360 may be manufactured by ST Johnson, San Francisco, Calif. In FIG. 14, the gases may go through the serpentine coil and be vented or with the burner may be used to fuel a closed system, like that of a boiler heating steam or hot water and the hot water may be re-circulated through a heat exchanger, which will be supplied with wastewater from the anaerobic digester. The biogas is sent to the burner in piping 263 and that may be comprised of a variety of materials and sizes known or used by one skilled in the art. In an embodiment, aluminum, stainless steel, or plastic 6 inch pipes are used.

In this embodiment, the heat and/or hot gases 362 coming from the burner go through a conduit that may be comprised of a variety of materials and sizes known or used by one skilled in the art. In an embodiment, carbon steel or stainless steel 2 inch pipes 364 are used. The pipes lead to a serpentine coil 342 in a sealed tank 340 similar to the system manufactured by Hoffland Environmental model no. 8CL10, which has a mixer creating a high mixing rate inside the heat exchanger. The cooler wastewater 423 from the anaerobic digester is pumped through the sealed tank and the heated water 425 returns through an insulated pipe back to the covered anaerobic digester, and that may be comprised of a variety of materials and sizes known or used by one skilled in the art. In an embodiment, carbon steel or stainless steel 6 inch pipes are used. Optimally, the wastewater in the anaerobic digester is heated up to about 95° F. This is especially an advantageous process in the winter and spring months in the cold parts of the country as the anaerobic digester operates optimally around 95° F. It is also important not to overheat the water in the tank, as it is not the object to kill the mesophilic bacteria within the anaerobic digester. The pump 264 from the anaerobic digester is usually most efficient to be a submerged, such as manufactured by Zoeller, Model G295 and conduit system is used to convey the unheated liquid from the digester to the heat exchanger tank.

By raising the temperature of the digester, the rate of digestion increases considerably, even up to about 50 times or more, as opposed to ambient digesters which operate without any external heat source or elevation of temperature, besides solar energy.

Alternatively, the gas may be burned beneath a vessel that holds water that is being treated and the water may be directly heated and then introduced into the anaerobic digester. If the concentration of the waste going to the digester is large enough, a sufficient amount of gas will be produced which can be converted to electricity with the excess energy recovered by the heat exchanger and the system becomes self sustaining, and even extra energy may be produced.

Figure 18:
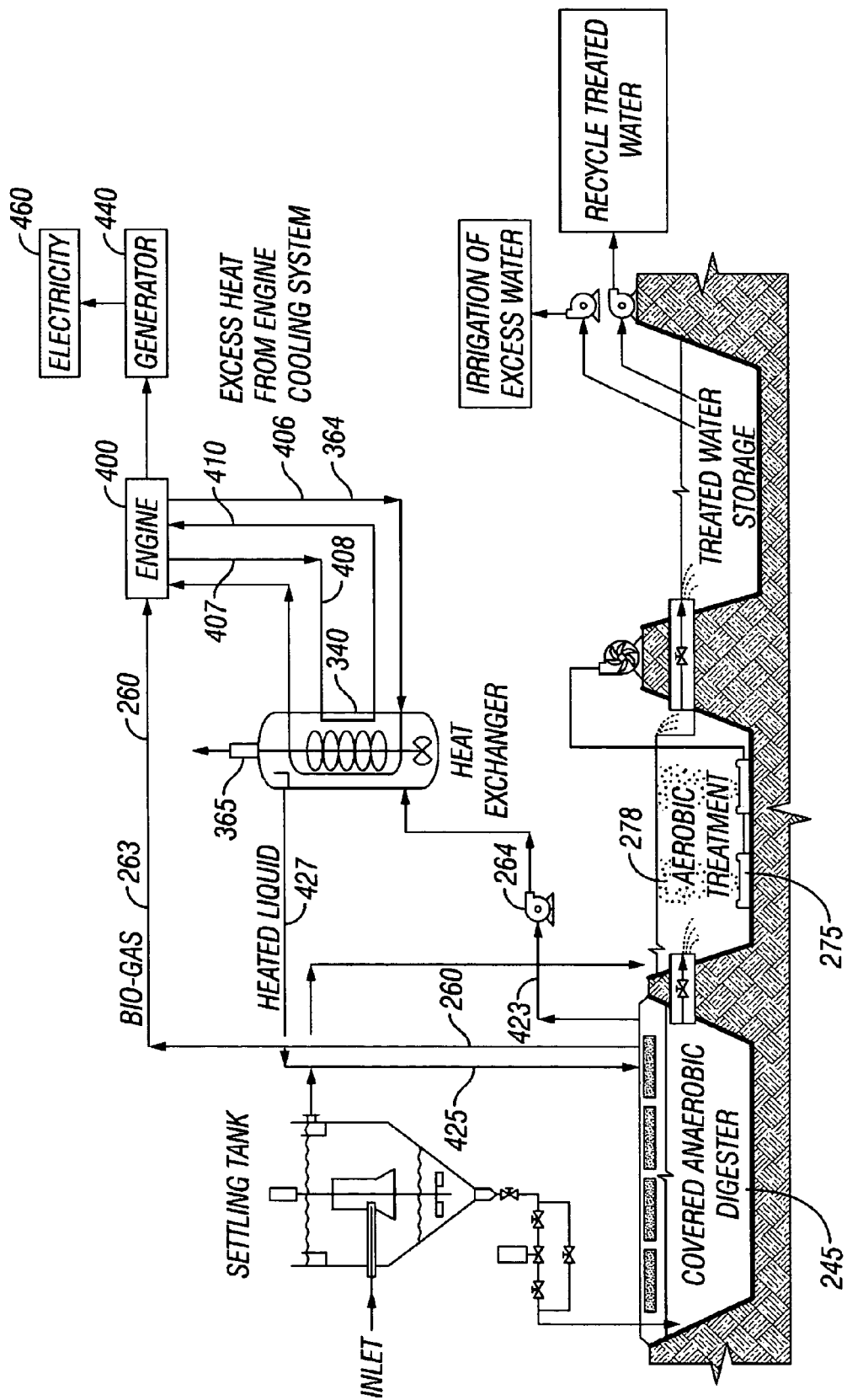
FIG. 18 is an illustration of an alternate embodiment of the present invention.

In this invention, as shown in FIGS. 18-19, an engine 400 can be used to burn the biogas 260 to drive a generator 440 and produce electricity. The engine will take the biogas, burn the biogas in the engine 400 that drives the generator 440, the generator produces electricity 460, and the electricity is used for any purpose. Also, the engine and/or generator produce a heated exhaust and/or waste heat 406. The waste heat is channeled into a conduit 364 that may be comprised of a variety of materials and sizes known or used by one skilled in the art. In an embodiment, carbon steel or stainless steel 2 inch pipes 364 are used. The excess heat produced by the generator and/or engine is then used by a heat exchanger 340 which recovers the excess energy to the system, i.e., at least a portion of the engine waste heat and/or heated exhaust 406 can be used to raise the temperature of the water in the anaerobic digester in order to speed up the anaerobic digester. See FIGS. 18-19. The exhaust and/or excess heat are vented 365 from the exchanger. The power from the generator may also be used to run the aerators, e.g., 270, 275, and/or pumps e.g., 264 of this invention. A heated outlet wastewater line 427, and may be comprised of a variety of materials and sizes known or used by one skilled in the art. In an embodiment, carbon steel or stainless steel 6 inch pipes are used.

A conduit 407 from the engine which contains exhaust and/or waste heat 407, is connected to a heat exchanger 340 that is used to cool an engine 400 burning biogas and producing heat 406, such as a heated exhaust and an engine waste heat, and less heated water 423 from the anaerobic digester is pumped into a heat exchanger 340 and a cooling water 408 from the engine is passed through the heat exchanger, liberating the heat from the engine to the wastewater and returning to cool 410 the engine, and wherein a return line conveys the heated wastewater 425 to the anaerobic digester to raise the temperature of the water in the anaerobic digester 245. See e.g. FIG. 18.

As a further embodiment, it is possible to use the engine and generator of FIG. 18 with one heat exchanger, with the burner and heat exchanger of FIG. 16, which are separate allowing enhanced energy capture and heating of the anaerobic basin with two heat exchangers.

In embodiments illustrated in FIGS. 11-18, the anaerobic digester preferably reduces the amount of organic components in the wastewater to approximately about 100 mg/l to about 10,000 mg/l. The flow rate of the anaerobic digester will vary depending upon the concentration and types of waste, as well as the temperature of the wastewater in the digester.

Once the desired carbon content of the waste in the anaerobic tank is reached, wastewater will be channeled into the aerobic lagoon through a conduit 256 preferably also comprising at least one mechanical and/or automatic or automated valve 240 the conduit can be comprised of a variety of materials known or used by one skilled in the art such as stainless steel and PVC. Because PVC is less costly, it is preferable to use a 12 inch PVC pipe. The liquid that flows from the anaerobic basin to the aerobic basin may be pumped or it may be gravity flowed through a controlled valve and the aerobic basin. The lagoon/oxidation basin is typically a self-contained vessel, whether plastic, concrete, or clay covering raw earth.

The nitrogenous wastes are not removed by the clarifier or by the anaerobic digester, either one. In the anaerobic system, the bacteria consume some of the nitrogen as part of its growth cycle, but when it dies it releases it all, so it all comes back out in the form of ammonia. The nitrogen in the wastewater must go through this denitrification process. This process is described for example in U.S. Pat. No. 6,054,044 to Hoffland. However, since that time, an alternative method has been discovered that does not require recirculation and baffles. Rather, the recirculation can take place convectively in the basin itself. Therein the nitrogen will be removed and reduced significantly by creating three levels of microbial growth within zones of the aerobic basin or lagoon. In the aerobic basin or lagoon, there are alternating zones of highly anaerobic high levels of exogenous oxygen and levels where there is no exogenous oxygen, where the nitrate is consumed and as it moves through the pond these re-circulation within the zone is set up without the addition of mechanical recirculation, such as by a pump. In the aerobic basin, the water is aerated by any type of aeration device to increase the exogenous oxygen content. There may be floating aerators as shown in FIGS. 12, 13, and 16, or there may be submerged aeration as shown in FIGS. 14 and 18. Aeration equipment provides sufficient dissolved oxygen to maintain an aerobic culture and to create a convective flow around the aerator(s).

Surface aerators shown in FIGS. 12, 13, and 16 that move water and atmospheric air into the lagoon in a sprinkler like fashion, which causes the water to mix around the aerators. Submerged aerators are typically operated via a pump or blower 280, e.g. FIG. 14. Additionally, a submerged perforated tube can be used to oxygenate the lagoon. The tubes may be laid in any sort of pattern or design and may be parallel to each other or crisscross. Preferably, a weighted tube is used so that the aeration does not cause the tube to rise within the lagoon. Also, preferably the tube may be disconnected so that if it becomes clogged, it can be replaced or repaired. Convective flow will occur between the pipes in the lagoon, like the convective flow shown in FIG. 15.

There is a highly aerobic zone where the bacteria forms a nitrosomos. Bacteria, which lives off the ammonia and forms nitrite, and then under aerobic conditions the nitrite, is oxidized to nitrate. The nitrate is still in the solution, containing soluble nitrogen that remains an excess nutrient with movement of the liquid around and through the zone, the ambient condition changes from aerobic to anoxic to anaerobic. Anoxic can be defined as the absence of oxygen, however in the wastewater industry anoxic may also be referred is just becoming anaerobic. When termed anaerobic, it is considered deeply anaerobic, after most of the oxygen containing compounds are removed. Under anoxic conditions, there is no free exogenous oxygen. Certain facultative bacteria can live under aerobic conditions and under slightly anoxic conditions will continue their life cycle metabolizing the oxygen that is contained in the nitrate radical. They consume the oxygen in a nitrate radical for metabolism forming carbon dioxide. The nitrate is therefore reduced and is released as nitrogen gas. This is called denitrification. The oxygen in the nitrate forms carbon dioxide as the microbes metabolize the available carbon source. In the absence of nitrate the system becomes deeply anaerobic. Under anaerobic conditions, the microbes use sulfate as an electron donor producing hydrogen sulfide. The solution convection moves the liquid back to the aerated zone where the Nitrosomonas bacteria that had become dormant now becomes active and begins metabolizing the ammonia. The nitrification of the ammonia forms nitrate and the cycle continues.

In the prior art, the accepted technique was to create a fully aerated aerobic treatment facility where sufficient aeration was provided to biologically consume essentially all of the carbonaceous material and then have sufficient aeration to nitrify the ammonia to nitrite and subsequently nitrate. Then the solution containing the nitrate was recycled either to the beginning of the process, which was maintained in an anoxic/anaerobic condition to denitrify the nitrate producing nitrogen gas. The nitrate was optionally transferred to a tertiary facility where additional carbon source was added to support the denitrification process. However, the embodiments of this invention teach that in the presence of excess carbonaceous material if the wastewater is cycled through highly aerobic zones followed by anoxic zones, the nitrification/denitrification is accomplished without the addition of further carbonaceous materials.

A culture of Nitrosomas bacteria is cultured to convert the ammonia ($NH_3$) to nitrite (NO). The problem with the conversion is that the Nitrosomas bacteria require a highly aerobic environment for it to live. This is usually stated as an oxygen concentration in excess of 1 mg/l. When a waste such as swine waste containing carbonaceous material as well as ammonia, is aerated, the microbial growth that consumes the carbonaceous matter will live well at oxygen level near zero. So, in most cases, sufficient oxygen must be provided to support the microbial growth to consume, essentially all of the carbonaceous matter before the microbes stop feeding and the oxygen content will increase to a level to support the Nitrosomas bacteria. So, the conventional technology consumes all of the organic matter, and then the oxygen concentration increases and the Nitrosomas bacteria metabolizes the ammonia.

The next reaction is with Nitrobacter, which under aerobic condition will convert the nitrite (NO) to nitrate ($NO_2$). The treated waste is now under aerobic conditions with all of the carbonaceous material consumed and an excess of nitrate. The nitrate is soluble, and remains in solution. Now, all of the nitrogen remains in the system, it has been biologically converted from ammonia to nitrate. The nitrate is an excess plant nutrient, and has essentially the same detrimental environmental effects as does ammonia.

To decompose the nitrate, the waste must be subject to anoxic or anaerobic conditions. When the nitrate is added to solution with active microbial growth and a food source but not an excess of oxygen, the facultative microbes will use the oxygen in the nitrate molecule to support their live cycle. The by-product is free nitrogen, a gas that is liberated. This is called "denitrification."

If highly aerobic conditions can be created in the presence of a food source, the Nitrosomas bacteria will flourish in the aerobic zone, then go dormant in the areas of low oxygen content. The nitrite and nitrate created in the highly aerobic zone become additional oxygen sources for the microbial growth in areas of low to near zero oxygen content. In essence, nitrification/denitrification can take place in the presence of high concentration of carbonaceous materials if highly aerobic zones and anoxic or anaerobic zones are created. The natural migration of the liquid through the treatment basin is sufficient to move the liquid through alternating zones of high aerobic area to support the growth of Nitrosomas microbes and anoxic zones for denitrification. Thus, mechanical recirculation is not required.

FIG. 15 shows an up close view of an example of submerged aeration. As shown in FIG. 15, in the area over the aeration device, the water is saturated with oxygen, preferably about 2-8 mg/l. The facultative microbial culture present lives very well, consuming the food present and multiplying. The highly aerobic zones also support the growth of the Nitrosomas bacteria. The entire area is fluid and the introduction of the air creates violent agitation. It also establishes a circulating movement around the aerator. The liquid is moving through the aeration basin in a plug flow manner, moving from the basin inlet to the basin discharge point. As it moves through the basin it passes through multiple aeration zones. Between the aerators and especially further away from the surface of the lagoon will be an area of anoxic water where anoxic cultures will thrive. Closer to the aerators and the surface of the lagoon will be an aerobic area where high concentrations of dissolved oxygen exist.

The induced circulating agitation around each area of oxygen introduction creates first a highly aerobic zone, followed by anoxic zones then anaerobic zones then returns to the aerobic zone. In the aerobic zone, with excess of oxygen, the nitrification and aerobic microbes flourish well. As the liquid moves from the highly aerobic zone to the anoxic zone, the Nitrosomas bacteria activity slows dramatically and the bacteria become dormant. The aerobic microbial growth continues to grow well as the oxygen content is depleted. In the absence of exogenous oxygen the liquid becomes anoxic. The facultative bacteria continue to grow using the oxygen within the nitrite and nitrate formed in the aerobic zone. When all nitrite and nitrate are consumed, the nitrogen is liberated and the zone becomes anaerobic. As the circulatory liquid movement moves near the bottom of the basin, the conditions become anaerobic. The facultative bacteria momentarily become inactive to dormant. As the liquid moves into the aerobic area, the facultative bacteria become active and the Nitrosomas also moves from the dormant state to the active state. The movement of liquid through the basin inherently moves the liquid waste through multiple zones of aerobic, anoxic and anaerobic activity.

There may also be an on/off switch 282 for exogenous oxygen, which may be manual or automatic. If it is automatic, it may also be programmed on such a time or other means known or used by one skilled in the art 284 for the desired on/off cycle and duration. The aerators may be run constantly, or can be selectively turned off in order to save energy. If the oxygen content comes up to high, then some of the units would be turned off to conserve energy, such as for about 10 minutes to even 10 hours or more. The aerators may be turned on or off in a staggered fashion such as where a zone had an undesired concentration of nutrients and/or cultures. Depending upon the temperature in the aerobic basin, concentration or nutrients, and the like, the aerators may be from 10% on to 95% on, 24 hours a day. The source of the exogenous oxygen will be atmospheric air since purified oxygen, is too expensive. The wastewater is oxygenated by bubbling the air bubbles 278 through it. Also, if a greater quantity of waste is coming in and the bacterial growth is so great that it is consuming all the oxygen that is available and then it goes anaerobic, more exogenous oxygen can be added by more aerators or more vigorous aeration. In summertime, the oxidative lagoon will work a lot faster without any exogenous heat, so it is likely that more vigorous aeration will be required in summer, and less in the winter. Depending on the type of aeration means, vigor of the aeration means, size of bubbles, temperature of lagoon, the aerations may be 5 inches to 10 feet apart, or even 10 feet to 100 feet apart as in the case of some surface aerators that may be 8 feet to 10 feet across. In the lagoon, the pH can be monitored as well as the oxygen. If a pH adjustment is necessary, exogenous bases or acids that are inexpensive and known to one skilled in the art can be added. A probe 500 in the aerobic basin/lagoon can monitor oxygen through an analyzer 510 that is commercially available and known to one skilled in the art, or a sample can be taken out and analyzed. See e.g. FIG. 12.

As the temperature declines, the activity of the Nitrosomonas bacteria also declines 72° F. 50° F., the growth rate of Nitrosomonas bacteria is approaching zero. Thus, the residence time between summer and winter will be different, with the residence time in the winter being longer. Thus, is it desirable to heat the anaerobic digester, and possibly the oxidative lagoon. If desired, the oxidative lagoon can be heated in the same manner as that described for the anaerobic digester. However, the heat will more rapidly dissipate from the uncovered lagoon.

In the embodiments set forth in FIGS. 11-18 the lagoon preferably reduces the amount of organic components in the wastewater to approximately about 25 mg/l to about 1,000 mg/l and/or wherein nitrogenous wastes are reduced by denitrification to about 5 mg/l to about 250 mg/l.

The flow rate to the lagoon may vary with a wide range of flows, such as about 20 ounces a minute to about 400 gallons a minute. The retention in the aeration basin should be 2 to 10 days. When the lagoon is working properly, the water furthest away from the inlet from the anaerobic digester will be the cleanest in terms of the amount of nutrients and bacterial cultures. If the clarifier performs correctly and the anaerobic and oxidative basins perform correctly, the biomass in the aeration basin is relatively low and an additional or secondary clarifier is not needed after the aeration basin. In farming areas, the aerobic basin may be large enough such that the nitrogen and organic wastes decompose with retention of about ten days. However, a certain amount of solids will continue to pass through the basin. If cleaner water is desired in the treated storage area, the water from the aerobic basin may be pumped through a secondary clarifier, flocculating chemicals may be added, and the clearwater from the clarifier flows into the storage basin. The collected solids can be returned to the primary clarifier.

Once the treated water from the aerobic basin 265 has reached the proper level of nitrogen and/or COD content it is then channeled through a conduit 535 that may be operated by a mechanical or manual valve 240 into a water storage area 532 and/or is used for irrigation and/or recycling. The conduit can be comprised of a variety of materials known or used by one skilled in the art such as stainless steel and PVC. Because PVC is less costly, it is preferably used, and a 6 inch to 12 inch pipe can be used.

Again, the treated water may be used for crop irrigation 560 or it may be recycled within the water treatment apparatus itself and alternatively, it may be used to flush the floor of a hog house or livestock production area 575 with additional treatment such as reverse osmosis or ultra-filtration and disinfecting the water can be utilized as drinking water for the animal.

Approximately 98% of the solids will decompose. The non-reactive materials such as silicates, carbonates, and sulfates and other components that are not metabolized by the bacteria will accumulate in the anaerobic and aerobic basin. Eventually, the basins will have to be drained and the nonreactive material be removed. The humus matter can be used for farming or soil enrichment.

The excess water used for irrigation is pumped up to about 60 lbs per square inch to 100 lbs per square inch to spray over the fields, such as by a high pressure centrifugal pump 550, such as a Gorman Rupp high pressure centrifugal pump, or other such pumps known or used by one skilled in the art.

The pumps utilized for recycling may be a Goulds centrifugal pump 552, such as with a 20 psi rating, or other such pumps known or used by one skilled in the art.

In this invention, a method for treating wastewater is contemplated, comprising providing a source of wastewater that comprises animal feces at least a portion of which is an insoluble solid and a nitrogenous waste, then introducing the wastewater into an inlet of a clarifier, the clarifier having a top edge and a bottom. Next, the wastewater is clarified to at least partially separate the wastewater into a clearwater portion at or near the top edge of the clarifier and wherein the solids are at least partially concentrated into a solids portion at or near the bottom of the clarifier. At least a part of the clearwater portion to a lagoon for nitrification and/or denitrification and/or a biological reduction of carbon. An at least a part of the solids portion is removed to an anaerobic digester for treatment, the digester containing at least one anaerobic culture, wherein at least one culture reduces the carbonaceous and organic content of the solids portion and produces a biogas comprised of methane and/or carbon dioxide and/or hydrogen sulfide. The anaerobic digester reduces the amount of organic components in the wastewater to approximately about 100 to 1,000 mg/l. Further, at least a portion of the wastewater from the anaerobic digester that has undergone an anaerobic digestion is moved to the lagoon for further treatment.

In this method, the lagoon reduces the amount of organic components in the wastewater to approximately about 25 mg/l to about 1,000 mg/l and/or nitrogenous wastes are reduced by denitrification to about 5 mg/l to about 250 mg/l.

If a closed digester is used or one that is covered with a nonpermeable membrane, the biogas may be burned by a flare to deodorize and detoxify the gas, or the gas can be collected and/or stored for later use.

The anaerobic digester may also be covered with a floating cover that is nonpermeable or semipermeable. Further, semipermeable membrane may be comprised of a polymer material that allows the biogas to slowly diffuse and to become at least partially oxidized and deodorized. Further, bacteria on and/or in the membrane can be used to at least partially oxidize and deodorize the diffusing biogas.

The method of the invention also contemplates using at least one means to burn the biogas, wherein the means is selected from the group consisting of an engine; a gas generator; an electrical generator; a flare; a gas burner; and a combination thereof. The heat and/or the energy generator can be used for a production facility or for any other use.

The biogas may be burned for a heat source to elevate the temperature of the wastewater in the anaerobic digester and/or the biogas may be burned to generate electricity. As a by-product of burning the gas, heat is produced. If so desired, at least a portion of the heat may be used to raise the temperature of the water in the anaerobic digester in order to speed up the process of anaerobic digestion.

For example, a wastewater outlet line from the anaerobic digester can be connected to a heat exchanger which utilizes a heat from an engine that is burning biogas and producing a heated exhaust and an engine waste heat. The wastewater can be circulated through the heat exchanger and heated engine coolant is lead into the heat exchanger to cool the engine and to heat the wastewater circulating through the engine. The heated wastewater is returned to the anaerobic digester, and the temperature of the wastewater in the anaerobic digester is raised.

The method and apparatus of this invention also contemplates providing a wastewater outlet line from the anaerobic digester that at least partially fills a heating tank, placing a heat conductive coil in the heating tank, connecting a conduit to an exhaust pipe and/or an engine cooling system of an engine that is burning the biogas and is producing a heated exhaust and an engine waste heat, connecting the conduit from the engine to the coil, so that the heated exhaust and/or engine waste heat flows through the coil and heats the wastewater in the heating tank and cools the engine. Next, at least a portion of the heated wastewater is returned to the anaerobic digester, and the temperature of the wastewater in the anaerobic digester is raised.

Similarly, the method and apparatus of this invention contemplates providing a wastewater outlet line from the anaerobic digester that at least partially fills a heating tank, placing a heat conductive coil in the heating tank, connecting a conduit to an exhaust pipe and/or an engine cooling system of a generator that is burning the biogas and is producing a heated exhaust and a waste heat, and connecting the conduit from the generator to the coil, so that the heated exhaust and/or waste heat flows through the coil and heats the wastewater in the heating tank and cools the generator. Next, at least a portion of the heated wastewater is returned to the anaerobic digester, and the temperature of the wastewater in the anaerobic digester is raised.

In this method and apparatus of this invention contemplates that an engine may burn biogas to drive a generator and produce electricity, wherein the engine produces a heated exhaust and engine waste heat. At least a portion of the engine waste heat and/or heated exhaust is used to raise the temperature of the water. The heated wastewater can then be returned to the anaerobic digester to raise the temperature of the wastewater in the anaerobic digester and the metabolic rate of the anaerobic cultures.

Once that has occurred at least a portion of the wastewater from the anaerobic digester to the lagoon for further treatment. In the lagoon, several different zones exist depending upon the oxygen concentration therein. Preferably, there are no baffles between the zones. There is at least a first portion of the wastewater in the lagoon with at least one anoxic culture in an anoxic zone, and at least a second portion of the wastewater in the lagoon with at least one anaerobic culture in an anaerobic zone, and at least a third portion of the wastewater in the lagoon has at least one aerobic culture in an aerobic zone. The various cultures further biologically reduce carbon from the wastewater and/or reduce the nitrogen content of the wastewater.

Also in the lagoon, there is preferably at least one means for supplying exogenous oxygen to create or maintain aerobic conditions, and to cause convective flow proximate to the exogenous oxygen in the lagoon. And, at least one aerating apparatus may be used to supply exogenous oxygen. The aerating apparatus causes convective flow and aerobic conditions proximate to the aerators when the aerators are turned on, anoxic conditions away from the aerators, and the cycling of at least a portion of the wastewater from aerobic conditions to anoxic conditions and from anoxic conditions to aerobic conditions when the aerators are turned on and off.

The aerators may be controlled by an on-off switch that is manually and/or automatically operated. The supply of exogenous oxygen can be turning off when a desired oxygen level is achieved, and then at least one aerobic zone cycles from aerobic conditions to anoxic conditions and from anoxic conditions to aerobic conditions. Later, the oxygen may be turned on when the oxygen level achieves a different pre-set level. Subsequently, there may be a cycling of the turning off and the turning on of the oxygen.

The method also contemplates determining the level of oxygen in the at least one aerobic culture zone by placing a probe in the aerobic zone or by laboratory testing of wastewater from the aerobic zone. Such methods of testing oxygen levels are well known by one skilled in the art.

In the lagoon, the nitrogenous wastes are reduced by denitrification to preferably about approximately about 25 mg/l to about 1,000 mg/l and/or the nitrogenous wastes are reduced by denitrification to about 5 mg/l to about 250 mg/l.

Once the water has been fully treated in the lagoon to reached the desired COD and nitrogen, at least a portion of the treated wastewater may be stored downstream from the lagoon. Further at least a portion of the treated wastewater downstream from the lagoon may be recycled such as by using the water to flush the production floor of wastes and/or at least a portion of the treated wastewater may be used for irrigation. If the water is used to clean an area where livestock wastes have accumulated, the wastewater that comprises animal feces at least a portion of which is an insoluble solid and a nitrogenous waste can be retreated by the foregoing method in the apparatus of this invention.

An apparatus for the treatment of wastewater is also contemplated by this invention. The apparatus comprises a clarifier comprising an inlet, a top edge, and a bottom, a first outlet at or near the top, and a second outlet at or near the bottom of the clarifier capable of capable of a least partially separating wastewater comprising an organic carbon component and a nitrogenous waste into a clearwater portion and capable of concentrating a solids portion comprising carbonaceous and organic material from the wastewater. The concentration of the solids allows the use of an anaerobic digester of a reduced size as compare to an anaerobic digester that has solids that have not been concentrated. Further, the apparatus comprises an anaerobic digester downstream from the clarifier that contains at least one anaerobic culture for reducing the carbonaceous and organic content of the solids portion, the culture also producing a biogas.

The apparatus may also comprise a means for collecting at least a portion of a biogas produced in the anaerobic digester and for storing the biogas. In this apparatus, the biogas may be burned and used as a heat source to elevate the temperature of the wastewater in the anaerobic digester and/or the biogas may be burned to generate electricity.

Further the apparatus may comprise a means to burn at least a portion of the produced biogas. The means for burning the biogas is selected from the group consisting of an engine; a gas generator; an electrical generator; a flare; a gas burner; and a combination thereof, or other such devices known or used by one skilled in the art to burn biogas.

The apparatus may further comprise a compressor for compressing the biogas prior to storing the gas in a storage tank. Compressors that compress gas prior to storage are well known in the art. Additionally, the apparatus may further comprise an air separation unit for purifying the methane in the biogas. And a semi-permeable membrane can be used for at least partially separating methane from the biogas.

Also, in the apparatus, there is a lagoon downstream from the anaerobic digester for treating the remaining carbonaceous and organic material from the anaerobic digester and the nitrogenous components of the wastewater from at least the clearwater portion of the wastewater, the lagoon comprising at least one anoxic zone, at least one aerobic zone, and at least one anaerobic zone. Further, this is at least one anoxic culture in the anoxic zone, at least one anaerobic culture in anaerobic zone and at least one aerobic culture in an aerobic zone in the cultures further removing organic material from the wastewater and/or nitrifying and/or denitrifying the nitrogenous wastes in the wastewater.

The apparatus of the invention, further comprises at least one means for supplying exogenous oxygen to the wastewater in the lagoon that creates or maintains aerobic conditions, and that causes a convective flow proximate to the exogenous oxygen. The means for supplying exogenous oxygen is selected from the group consisting of at least one submerged aerator; at least one surface aerator; a fine bubble aerator; a coarse bubble aerator; a submerged tube with a plurality of air holes therein; a submerged pipe with a plurality of air holes therein; and a combination thereof, or, any such devices known or used by one skilled in the art for supplying exogenous oxygen. Typically, a blower is used in conjunction with the aerators. Further, the apparatus may comprise an on-off switch that manually and/or automatically controls the at least one aerator.

In the apparatus, there may also be at least one means for supplying oxygen that is controlled by an on-off switch that is manually and/or automatically operated. In this apparatus, the exogenous oxygen is preferably comprised of atmospheric air.

The apparatus may further comprise a means for turning off the exogenous oxygen when the oxygen level achieves a pre-set level for a pre-set period of time, and a means for turning on the exogenous oxygen when the oxygen level achieves a different pre-set level, wherein the wastewater in the at least one aerobic culture cycles from aerobic conditions to anoxic conditions and from anoxic conditions to aerobic conditions, and a means for cycling the turning on and off and turning on of the oxygen.

The apparatus may further comprise a means for determining the level of oxygen in the at least one aerobic culture wherein the means comprises a probe in the culture or laboratory testing of a portion of the aerobic culture.

Finally, there is a means for storing and/or using the treated wastewater downstream of the lagoon.

The apparatus may also further comprising means to add various chemicals known or used by one skilled in the art for sewage treatment. Further, the apparatus may comprise means to adjust the pH of the wastewater.

The various embodiments herein described may be combined, separated and rearranged to provide a system suitable for a particular use and no one embodiment herein described shall be limited by its arrangement.

In addition to apparatuses for the treatment of wastewater, the present invention envisions a method for treating wastewater. Such method generally comprises a process involving the aforementioned embodiments. Generally, such processes comprise the steps of obtaining a wastewater, screening or otherwise separating the wastewater to remove solid particles and anaerobically digesting and/or clarifying the wastewater to produce a treated wastewater. The produced biogas may be collected and used, burned by a flare, or oxidized by a semi-permeable membrane. The heat produced from the biogas may have a variety of uses, including raising the temperature of the anaerobic digester and the bacterial metabolism. The method may be modified by the addition of pretreating, further screening, clarifying, bio-tower treatment, chemical treating, and/or alternate arrangement of the steps.

An alternative embodiment is preferably an economical method to substantially eliminate the application of treated or untreated animal waste to the cropland. This also substantially eliminates the over application of plant nutrients such as, but not limited to, nitrogen, phosphorous, potassium, and sulfur to the farmland. It substantially eliminates the open spraying of excess liquids usually containing obnoxious odors, which are liberated by spraying action over spray fields to disperse the excess liquids.

FIGS. 20-30 illustrate embodiments of the present invention, process, and apparatus for treatment of animal waste without liquid land application. The animal waste being treated may be from, but not limited to, live stock production facilities, such as cattle, swine, goat, sheep, horse, reptiles, and the like. It can also be from chicken and turkey ranches, duck farms, geese farms, other animal or human waste, and the like. The waste containing feces, manure, urine, and waste feed, with or without flush water, is preferably transferred by pumping or gravity flow to a storage basin which may be a below grade lined or unlined earthen basin or tank. Due to ever present bacteria and protozoa, the storage facility by design will become an anaerobic storage facility where the microbial activity will decompose the carbonaceous materials.

The storage area will have adequate retention time to biologically decompose essentially all of the carbon containing material. The storage time may be from two months to twenty years or other time frame dictated by design or operation. The rate of decomposition is highly dependent upon the ambient temperature. Four to eight months is preferably a minimum time span. It is most desirous to decompose all of the carbon matter, however, because of the hydraulic flow through the facility, entrainment of waste as well as the microbial lysis, and slow decomposition of some components, it is not practical or economically desirable to capture 100% of the organic matter. The by-product of the anaerobic digestion process is typically carbon dioxide, methane, hydrogen sulfide, dimethyl sulfide, and other sulfur containing gases. The anaerobic digestion process consists of several steps for example:

The key components of the biogas ($CH_4+CO_2+\ldots$) produced during biogasification are underlined in the equations below. The chemical formulae of manure and bacteria used in the equations are $C_6H_{13}NO_5$ and $C_5H_7NO_2$, respectively. Biogasification is a bio-chemical process in which complex carbon (organic) compounds (polysaccharides, proteins, lipids/fat, ...) in the manure, feces, or other solid waste are broken down by six different bacteria to biogas with $C_6$-, $C_4$-, $C_3$-, $C_2$-intermediary compounds. Equations 1-7 list the typical bio-chemical reactions of the process. The mass transformation from the complex carbon compounds to the single carbon compounds of methane and carbon dioxide in biogas.

Hydrolysis of Manure:

$$C_6H_{13}NO_5(\text{manure})+H_2O+H^+ \rightarrow C_6H_{12}O_6+NH_4^+ \quad [1]$$

Acetogenesis:

$$C_6H_{12}O_6+0.1115NH_4^+ \rightarrow 0.1115\,C_5H_7NO_2+$$
$$0.744CH_3COOH+0.5CH_3CH_2COOH+$$
$$0.5CH_3CH_2CH_2COOH+\underline{0.454CO_2}+0.446H^+ \quad [2]$$

Propionate Hydroaenesis:

$$CH_3CH_2COOH+1.786H_2O+0.0458NH_4^+$$
$$\rightarrow 0.0458C_5H_7NO_2+0.924CH_3COOH+2.778H_2+$$
$$0.1832H^++\underline{0.0924CO_2} \quad [3]$$

Butyrate Hydroaenesis:

$$CH_3CH_2CH_2COOH+1.84H_2O+0.0545NH_4^+$$
$$\rightarrow 0.0545C_5H_7NO_2+1.86CH_3COOH+1.92H_2+$$
$$0.2180H^+ \quad [4]$$

Homoacetogenesis:

$$2.073H_2+CO_2+0.0487NH_4^+ \rightarrow 0.0487C_5H_7NO_2+$$
$$0.378CH_3COOH+1.146H_2O+0.1948H^+ \quad [5]$$

Hydrogen Methanoqenesis:

$$3.813H_2+CO_2+0.022NH_4+ \rightarrow 0.022C_5H_7NO_2+$$
$$\underline{0.89CH_4}+1.956H_2O+0.0882H+ \quad [6]$$

Acetate Methanogenesis:

$$CH_3COOH+0.022NH_4^+ \rightarrow 0.022C_5H_7NO_2+$$
$$\underline{0.945CH_4+0.945CO_2}+0.06H_2O+0.0882H^+ \quad [7]$$

Some of the intermediary products are volatile organic acids which also have an undesirable odor.

Figure 20:
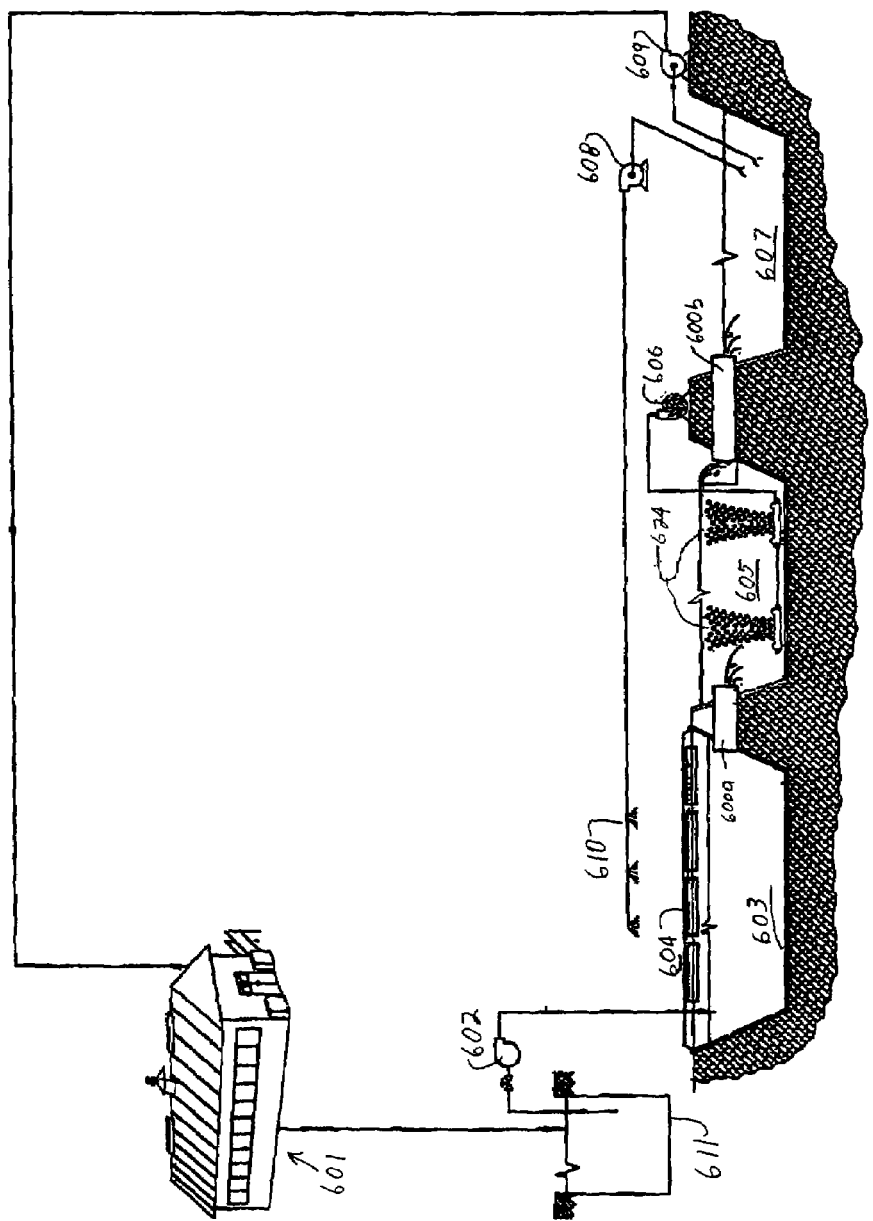
FIG. 20 is an illustration of an alternate embodiment of the present invention.
Figure 21:
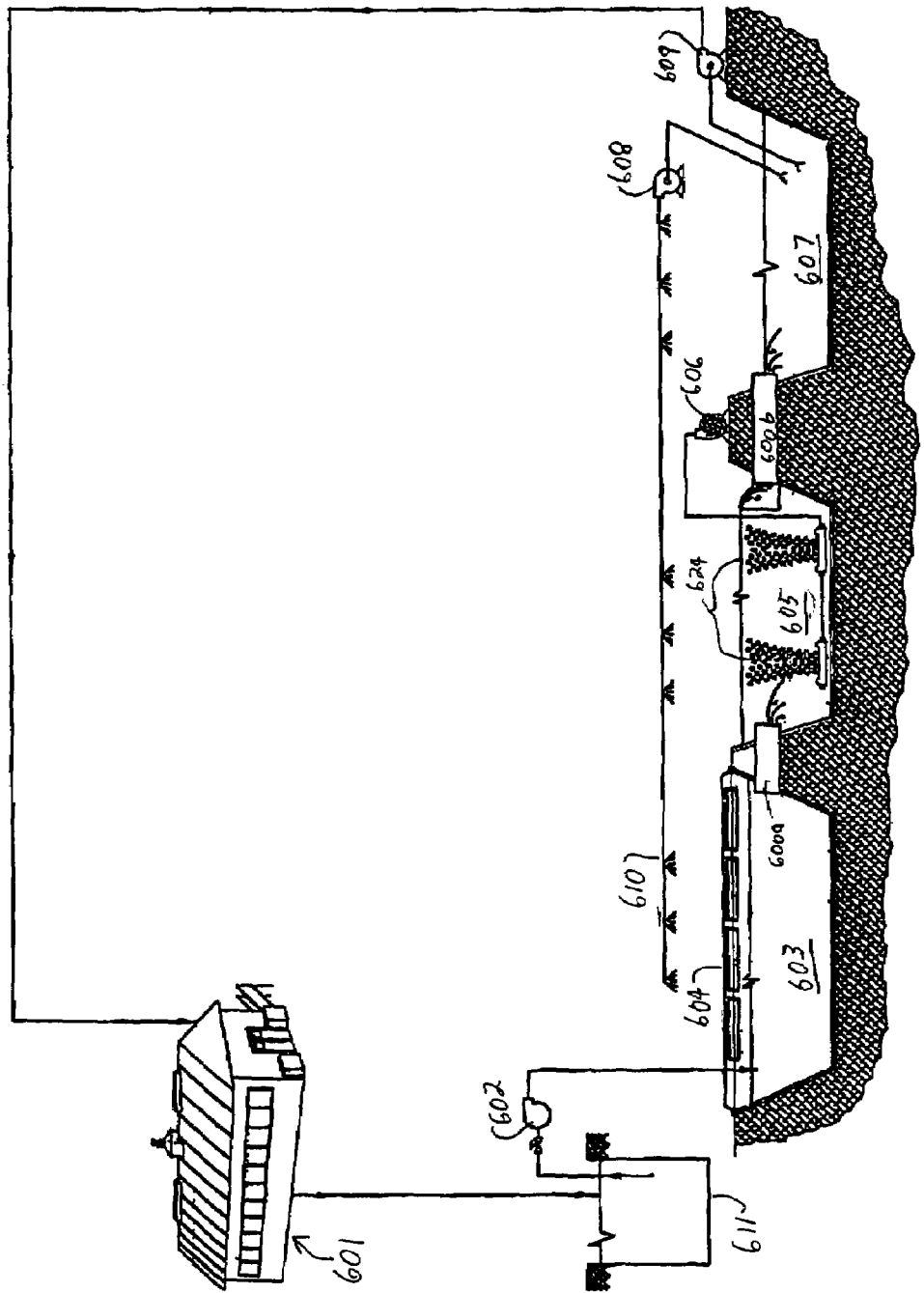
FIG. 21 is an illustration of an alternate embodiment of the present invention.

Referring now to FIG. 20, an embodiments illustrated comprising an animal waste source 601, a lift station 611 to transfer the collected waste 602, an anaerobic basin 603, an open aerated basin 605, and a storage basin 607. In this embodiment, the anaerobic basin 603 is preferably covered with a semi-permeable membrane 604 that permits gases to pass through in an upward movement and collected rainwater and accumulated water from spray nozzles 610 to pass through in a down ward movement. Again due to the ever presences of microbial growth and their ability to mutate, an aeration culture of sulfide consuming microbes will preferably develop. These aerobic microbes will promote the oxidation the malodorous sulfide containing gases. The result is a substantially odor free anaerobic storage facility. The organic matter added to the anaerobic storage facility will preferably be decomposed to carbon dioxide and methane and the naturally produced undesirable sulfide containing gases will be oxidized to non-odorous compounds. The water used as a liquid conveyor of the organic solids preferably flows through the basin with the effluent, respective to the influent, less the decomposition, containing some entrained microbes, soluble salts, potassium, phosphorus, ammonia, and other non-decomposed products.

The effluent is preferably transferred by gravity or pumping to a second basin, an open aerated basin 605. It should be appreciated that the basins can be, but are not limited to, above grade, including tanks, or below grade. It should be understood that the movement or transfer of the wastewater from one basin to another is illustrated in FIGS. 20-30 as conduit 600a and/or conduit 600b. These conduits are illustrated for simplicity in understanding however, they can be pipes, tubes, hoses, or a variety of other conventional devices for transferring liquid and as such should not be viewed as a limitation herein. Further, the conduits 600a and 600b could be multiple conduits and if more basins are used downstream then more conduits would be necessary to transfer the wastewater. Preferably, the second basin 605 will be maintained in aerobic condition to aerobically decompose additional carbonaceous matter as well as biologically nitrify and subsequently denitrify the ammonia and nitrogen containing compounds. The aerobic condition may be created by the mechanical introduction of air to produce the dissolved oxygen which supports the metabolism of the aerobic microbes. Preferably the air is added through any number of conventional aerators 624 which may utilize a conventional blower 606. The air may be added by surface aerators such as Aqua Aerobics model CFSS or submerged fine bubble diffusers such an Air Aqua model 130 with a positive displacement blower or through an air aspiration system such as Air Jammer model 400. Aerobic conditions may be also be produced latently, by the natural dissolution of oxygen into water. The basin should be constructed sufficiently large to foster the dissolution of adequate oxygen. The net result is treated waste streams with significantly reduced levels of ammonia and nitrogen and in an aerobic condition to essentially eliminate the malodor associated with the storage of anaerobic waste. The treated water will typically contain the soluble inorganic salts (plant nutrients) such as phosphorous, potassium, and sulfur.

The treated water may be transferred to a third basin 607 for intermittent accumulation, further decomposition, and/or storage. It should be appreciated that short-term storage of the wastewater may be provided somewhere within the process train to compensate for daily surges, light levels of rainfall and poor evaporation in cold months. The storage may be provided in the third storage basin 607 or by over-designing the anaerobic and aerobic basins 603, 605 and operating them at the low level using the extra capacity for storage during inclement or otherwise unfavorable weather.

The treated or decomposed water can then sprayed through nozzles 610 over the anaerobic basin 603. Preferably, the water is drawn such as by, but not limited to, pump 8. It should be understood that the moving of the treated wastewater to the nozzles 610 depends on the topography of the treatment facility such as elevation differences between the basins 603, 605, 607, and the wastewater source 601. It should be appreciated, by those skilled in the art, that the treated or decomposed water may be discharged, through the nozzles 610, over either or both of the other basins 605, 607 (see FIG. 21).

The spray evaporation system is designed to evaporate the water using solar energy. The number of nozzles 610, outlets, and type nozzles are all taken in to consideration in the design of the system. Mechanically pumping 8 the treated water under pressure through nozzles 610 is preferably designed to produce fine droplets of water which dramatically increases the rate of evaporation. The process is designed to incorporate sufficient nozzles to evaporate all excess water over the basins whether spraying over one or more of the anaerobic basin 603, the aerobic basin 605, or the third basin 607. A large portion of the sprayed water is solar evaporated. The remaining highly aerobic water falls on the basin cover providing a source of oxygenated water to supplement the aerobic cultures growing in the basin cover. The spraying of the liquid creates droplets with corresponding ultra high surface area fostering a rapid evaporation. The source of heat energy for the evaporation is solar energy. The action of spraying and creating small droplets not only fosters rapid evaporation but also supersaturates the un-evaporated portion of the droplet with oxygen. The dissolved oxygen rapidly reacts with unstable sulfide containing compounds producing stable sulfate compounds which are not perceived as offensive. When the highly oxygenate droplet falls on the surface of the anaerobic basin, a layer of highly reactive oxygenated water forms on the surface. Malodorous gases being produced by the anaerobic digestion of the carbonaceous matter moves up through the liquid and would normally be emitted from the surface. However since the highly oxygenated surface layer is present, as the malodorous gases move upward through the layer of oxygenated liquid, the soluble oxygen present reacts with the malodorous gases forming new oxidized compounds which are not perceived to be obnoxious. The excess plant nutrients such as, but not limited to, potassium, phosphorus, nitrogen, and sulfur are all permitted to accumulate in the anaerobic basin 603 and the aerobic basin 605. There is no excess water to be land applied.

Preferably, the covered anaerobic basin 603 may be of any depth dependant upon several factors including but not limited to the volume of wastewater treated, the available area, the level of ground water and the like. The carbonaceous waste matter is biologically degraded with a microbial culture, that may be inoculated by natural or artificial means. The gaseous by products of the anaerobic digestion are permitted to rise up through the mixture in the basin and permeate the permeable cover 604. An aerobic microbial culture growing in the permeable cover material, oxidize the sulfur based gaseous compounds, removing the characteristic anaerobic odor. The ammonia is also oxidized by a specific microbial culture, removing the characteristic ammonia odor.

Referring still to FIG. 20, the treated water leaving the anaerobic basin 603 flows to the aerobic basin 605. Air blower 606, provides dissolved oxygen to support the aerobic culture. In the embodiment illustrated in FIG. 20, the blower 606 provides air to underwater aerators 624. The remaining carbonaceous matter is further decomposed to carbon dioxide and the remaining ammonia is oxidized to nitrate. The treated water then flows to the storage basin, 607. The storage basin 607 may be replaced with additional storage capacity built into the aerobic basin 605 and/or the anaerobic basin 603. The water level in the initial two basins may be permitted to fluctuate providing the required storage by letting the water level rise and fall several feet.

The treated water may be pumped, via pump 609 or other fluid moving mechanism, back to the animal housing 601 area to flush the floor. The excess water is preferably pressurized by another pump 608 or other fluid moving mechanism, and sprayed through nozzles, 610, over the anaerobic basin cover, 604. It should be appreciated that the water drawn by pump 609, for flushing the wastewater source 601, can be drawn from other basins including the anaerobic basin 603 or the aerobic basin 605. The pumping/spraying rate, volume, and operating time will be adjusted to evaporate the excess liquid that accumulates in the system. Preferably, there is no land application of the excess liquid required.

Figure 22:
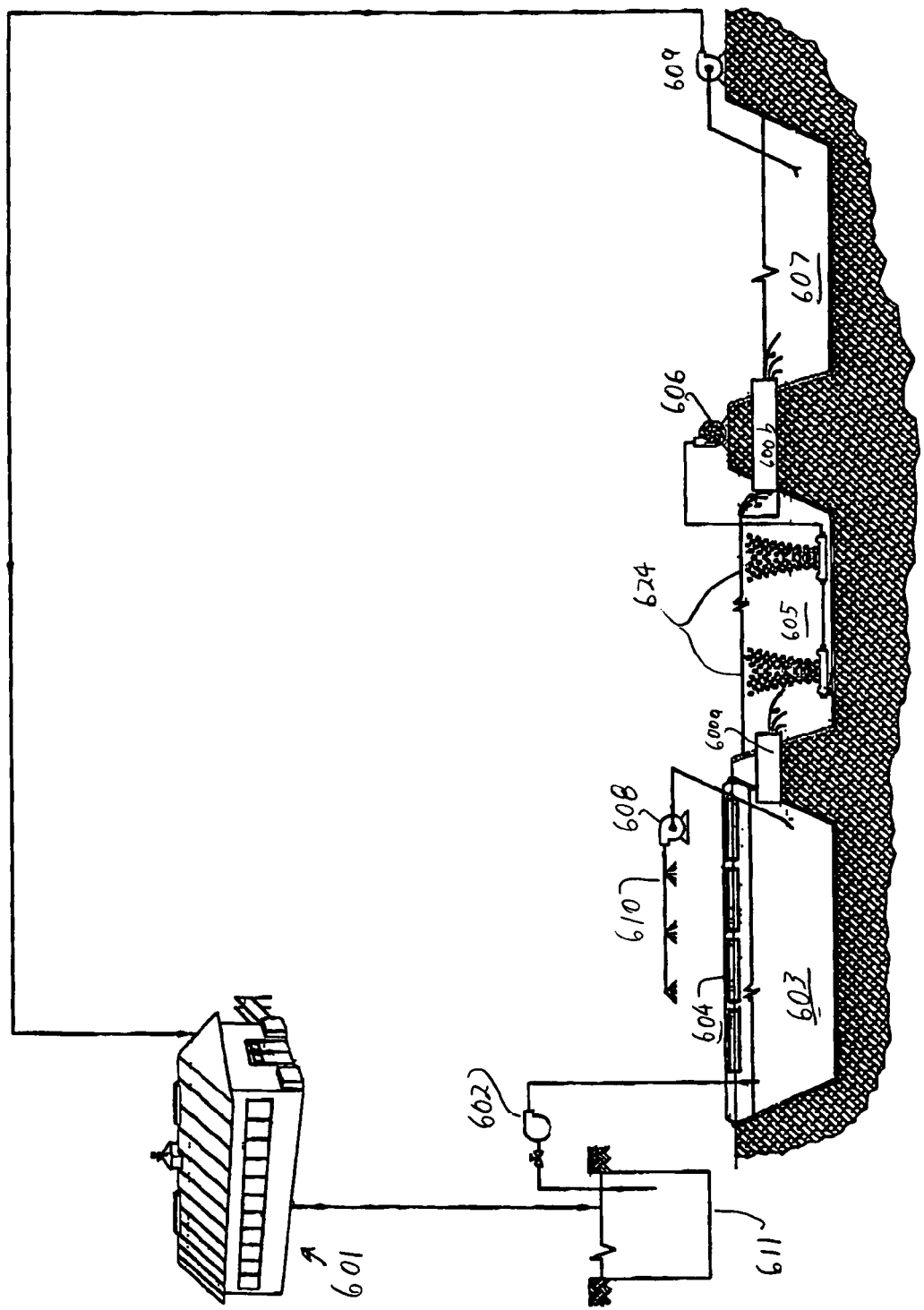
FIG. 22 is an illustration of an alternate embodiment of the present invention.

FIG. 22 illustrates an alternate embodiment, wherein pump 608, or other fluid moving mechanism, moves the water from the anaerobic basin 603 through the spray nozzles 610 over the anaerobic basin 603. It should be appreciated that the water spraying, through nozzles 610, can comprise drawing the water from any available basin or from more than one basin as well as spraying the water over the basin from which it is drawn, any other basin, or any combination thereof. Another illustration of this is shown in FIG. 23, wherein pump 608, or other fluid moving mechanism, moves the water from the third basin 607 through the spray nozzles 610 over the anaerobic basin 603.

Figure 23:
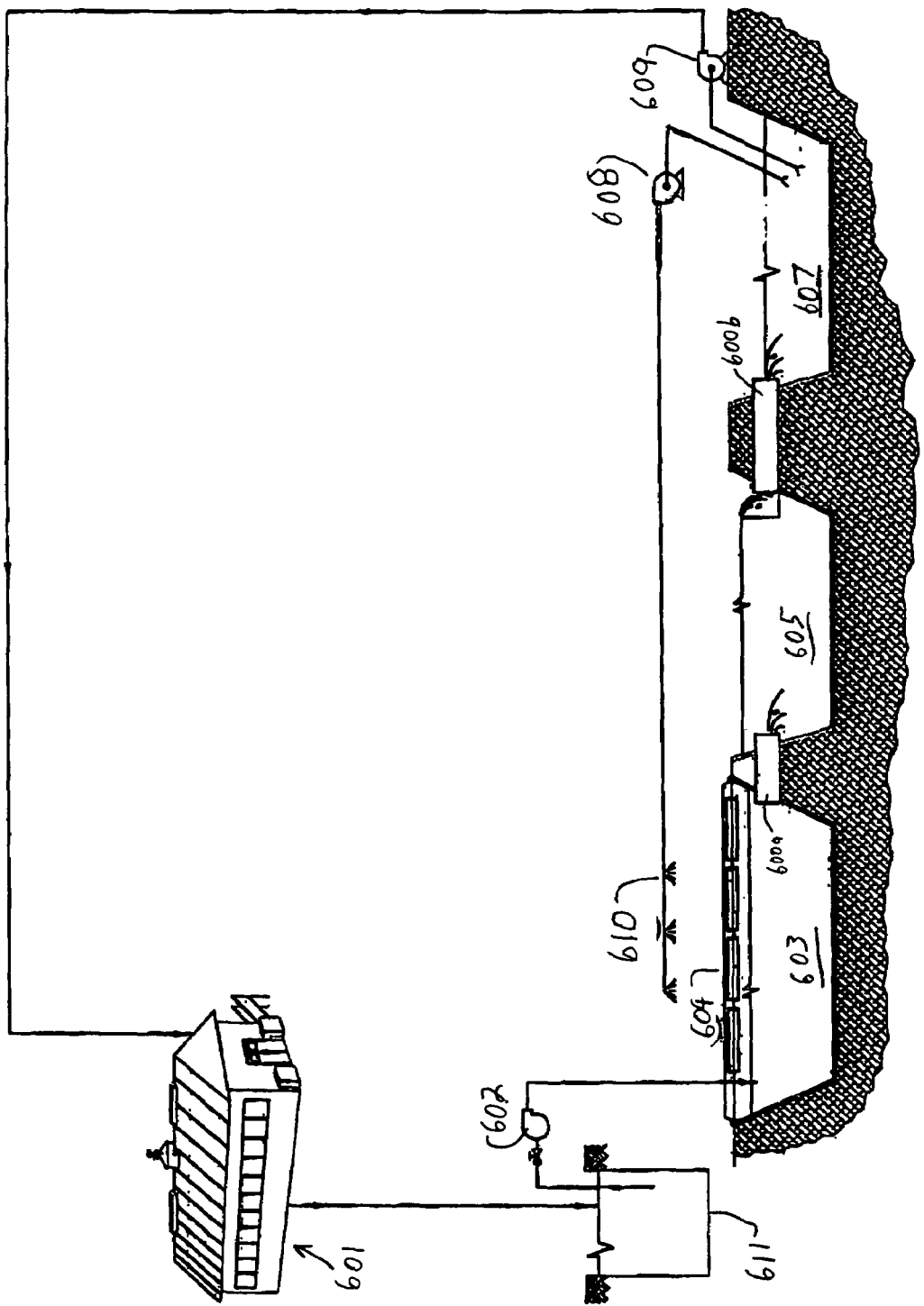
FIG. 23 is an illustration of an alternate embodiment of the present invention.

Still referring to FIG. 23, the illustrated embodiment includes the use of a naturally aerated aeration basin 605 where no mechanical aeration 624 (see FIG. 22 for an example of the mechanical aeration system 624, 606) is required. Naturally inherent dissolution of atmospheric oxygen provides sufficient exogenous oxygen to maintain microbial metabolism.

Figure 24:
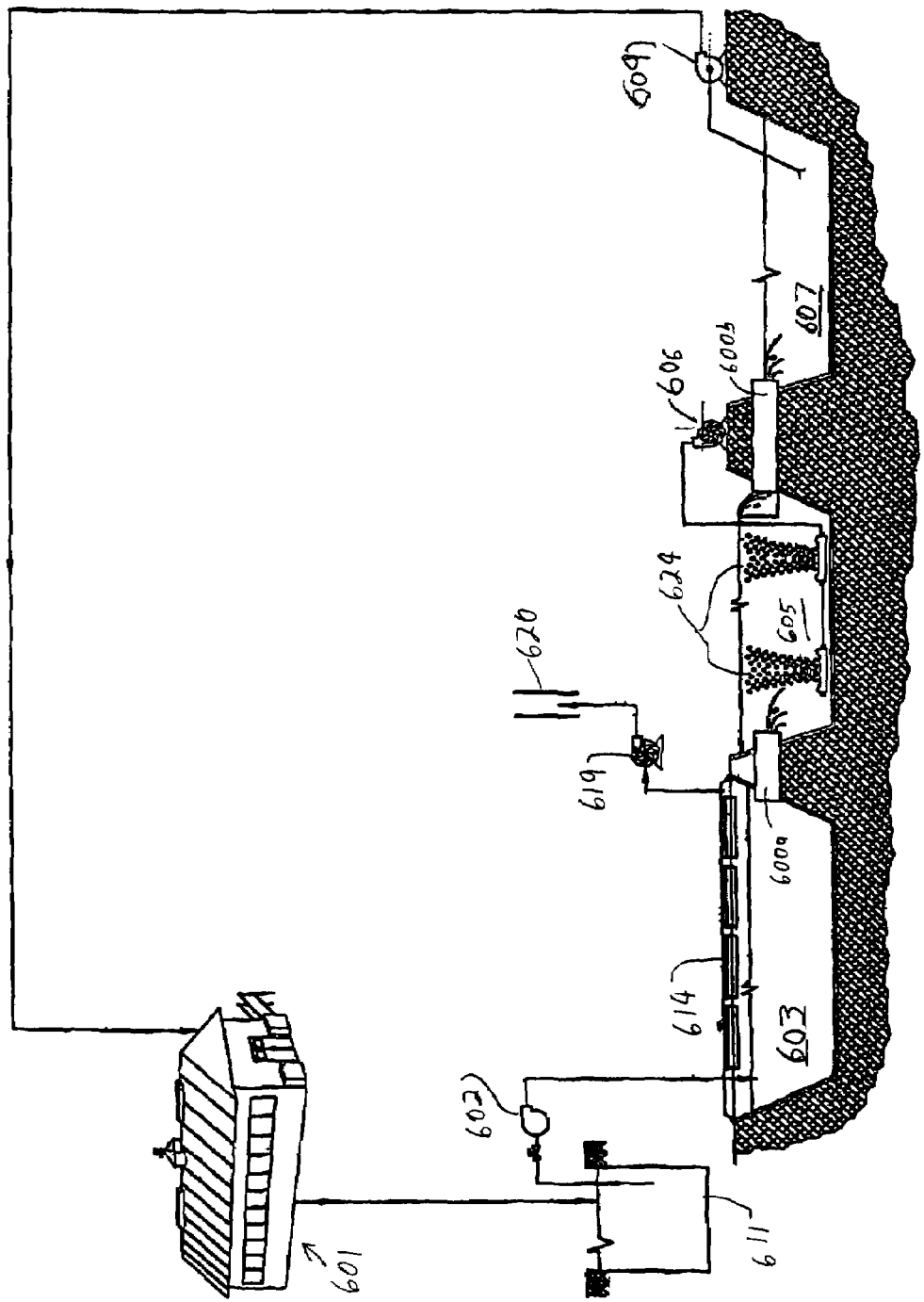
FIG. 24 is an illustration of an alternate embodiment of the present invention.

FIG. 24 illustrates another embodiment of the process and apparatus for the treatment of waste without the malodors normally associated with the anaerobic storage and treatment of waste and wastewater. The anaerobic basin 603 or tank may be covered with a flexible or rigid cover 614 that is impermeable and as such collects the gases produced by the digestion of the organic matter. The cover 614, on the anaerobic digester 603, is installed to retain and collect the biogas produced by the anaerobic digestion of the carbonaceous matter or serve as a bio-oxidizing gaseous filter to bio-oxidize the sulfide containing the malodorous compounds. The produced gas or biogas contains principally methane and carbon dioxide as well as, trace levels of ammonia, hydrogen sulfide, and organic sulfide compounds. It should be appreciated, by those in the art, that as a "Green House" gas, methane is some twenty-one times more destructive to the environment than an equal amount of carbon dioxide. In certain cases it is advantageous to either remove the methane or convert the methane to carbon dioxide. The sulfur based compounds may be converted to sulfate compounds that do not have the undesirable odor. Using the impermeable cover 614 the biogas is collected and may be further processed.

The biogas may be processed to separate the carbon dioxide and sulfur compound from the methane. The methane may then be further purified and supplied to the natural gas pipeline. The remaining effluent from the anaerobic digester 603 will be processed through aerobic treatment 605 and then sprayed over the one or more of the other basins for solar evaporation.

When the anaerobic basin 603 is covered with an impermeable cover 614, the biogas that is collected may also be further treated. One such example is that the biogas may be incinerated through a flare (see FIGS. 24 and 25). Typically the biogas will usually support combustion of the entire gas stream. A propane, butane, or methane pilot may be operated continuously to ignite the gas or it may have an automatic control that ignites the pilot when a loss of the main flare flame is sensed. Another example is that the biogas may be scrubbed in a scrubbing tower filled with a media that fosters the growth specific autotrophic microbes mainly of the Thiobacillus genus that oxidize sulfide containing compounds to sulfate compounds (see FIGS. 26 and 27). These microbes use the carbon dioxide as a carbon source for their metabolism. The Thiobacillus bacteria are slow growing and require a support media to be retained in the system. Yet in another example, the biogas may be further processed by membrane separation or similar separation techniques to separate and purify the methane. The separated methane may then be marketed or used on site to produce, for example, methanol.

Referring again to FIG. 24, the effluent from the anaerobic digester 603 will be further treated, in an aerobic basin 605, by an aerobic microbial culture to remove the remaining carbonaceous matter and bio-oxidize the ammonia to nitrate which is subsequently reduced to nitrogen gas. Preferably, the collected gases are conveyed through duct to an inline blower 619, which compresses and transfers the gas to a flare 620. It should be understood that the collection, processing, and conveying of the gathered gases to the flare 620 may comprise other conventional methods as well as state of the art methods to come and should not be viewed as a limitation thereof. The gases are oxidized in the flare 620, to carbon dioxide, water vapor, and sulfur dioxide and other related compounds of combustion. Preferably, the methane component of the biogas provides sufficient energy to sustain combustion. An additional source of energy such as natural gas or propane, may be added to the flare 620 to sustain combustion during periods of limited biogas supply. The effluent from the anaerobic basin 603, after digestion, will still contain some carbonaceous products plus the excess microbial culture. The effluent flow is preferably pumped to an aerobic basin 605, to biologically oxidize the remaining carbonaceous matter and ammonia using an aerobic microbial culture. FIG. 24 further illustrates the use of exogenous oxygen, supplied by mechanical methods 606, 624. However, as explained herein, the exogenous oxygen can be supplied by natural methods. As described above, the treated water can be moved to another basin 607 and then moved to utilize solar evaporation to reduce the volume of the wastewater.

Figure 25:
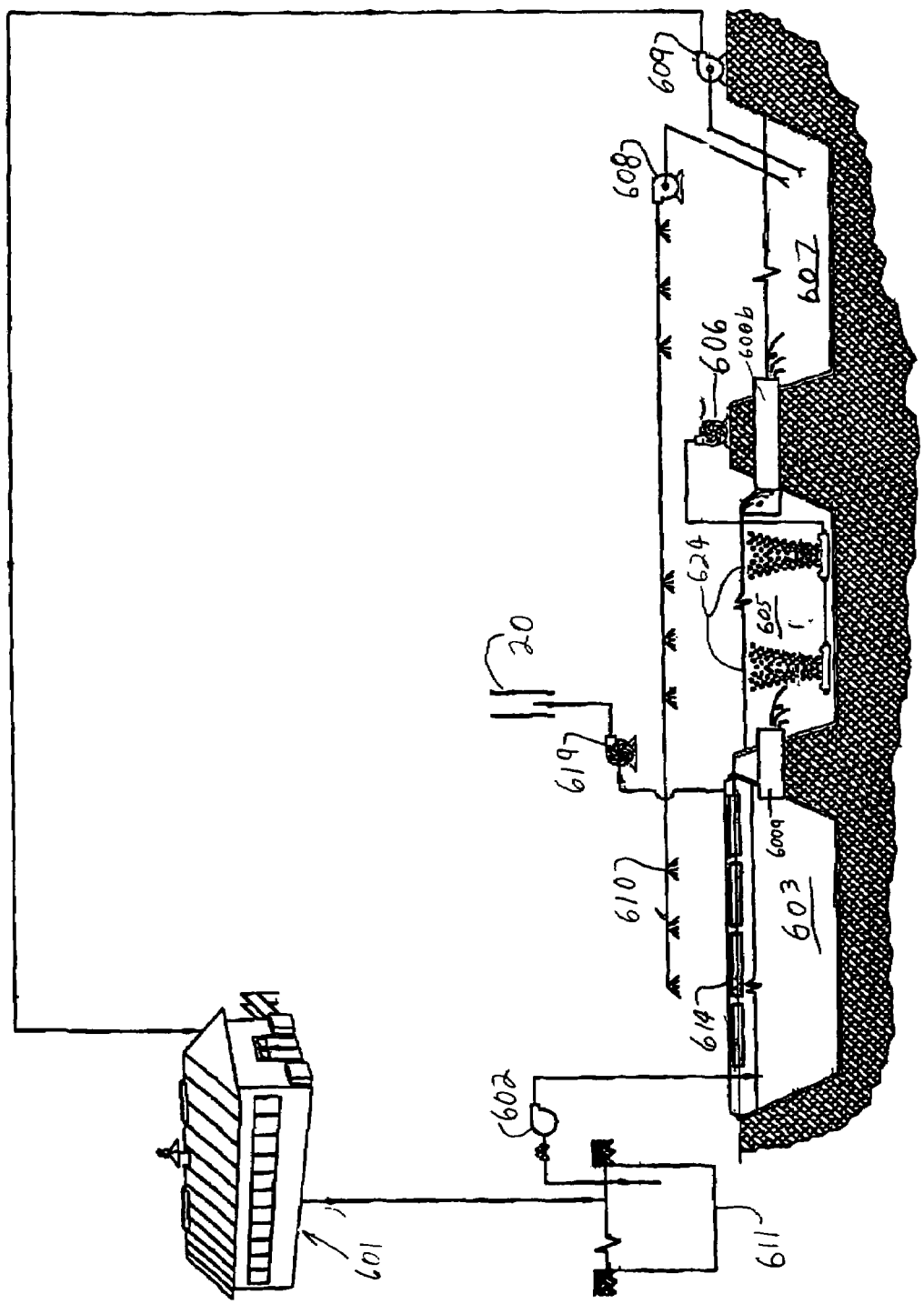
FIG. 25 is an illustration of an alternate embodiment of the present invention.

FIG. 25 illustrates another embodiment of the present disclosure. As described above, the treated water can be moved to another basin 607 and then moved by system 609 for use in washing the waste source 601 or may be sprayed, through nozzles 610 over the anaerobic basin 603, the aeration basin 605, the storage basin 607, or any combination thereof to utilize solar evaporation to reduce the volume of the wastewater and substantially eliminates the need for land application of the treated wastewater. It should be appreciated that the treated water can also be extracted, by system 608, from other basins or from more than one basin. FIG. 25 further illustrates examples of mechanical aeration 6, 26, the transfer 609 of the treated water for washing the waste source 601, as well as the impermeable cover 614 and the utilization of the blower 619 and the flare 620.

Figure 26:
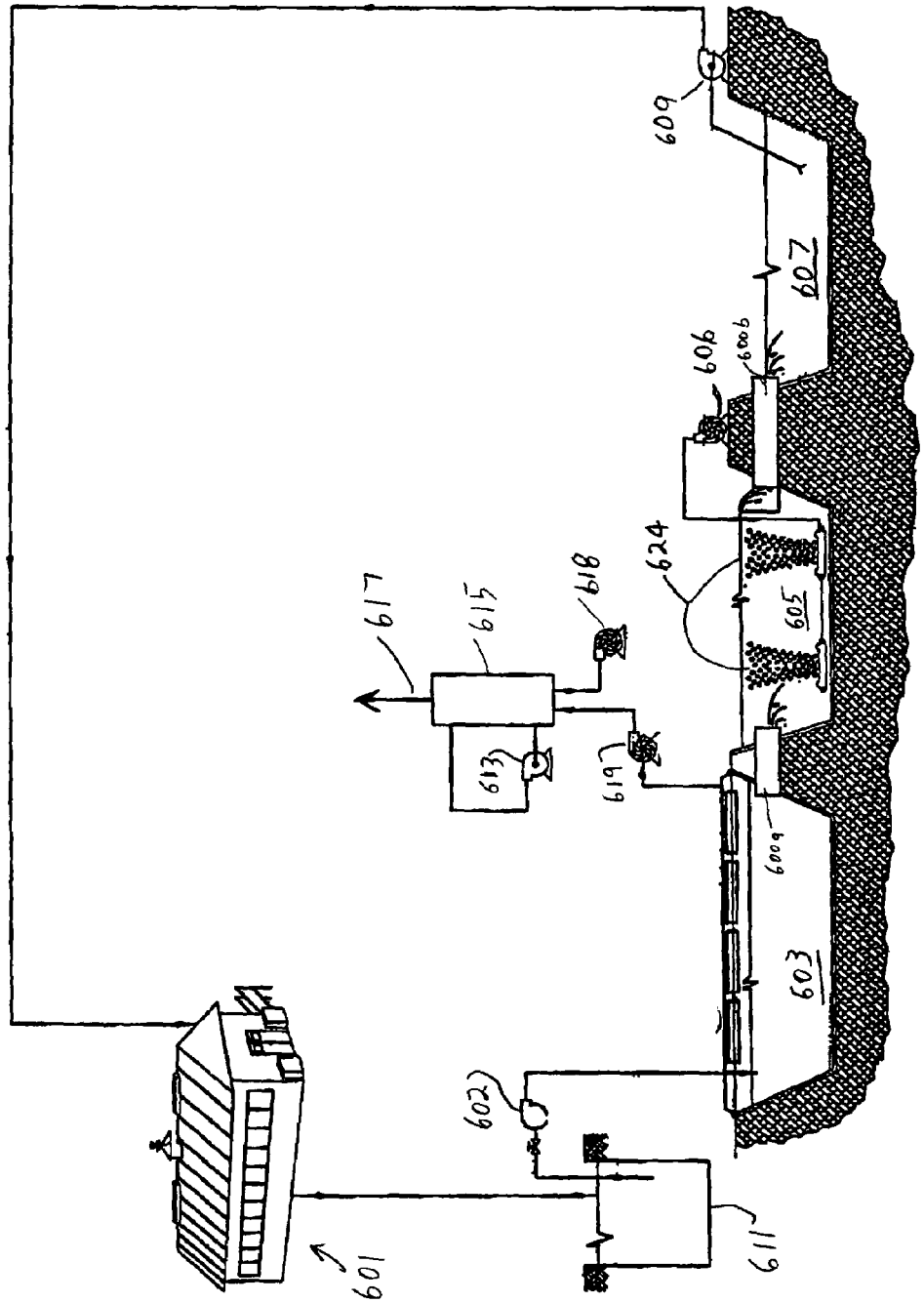
FIG. 26 is an illustration of an alternate embodiment of the present invention.

FIG. 26 illustrates another embodiment of the process and apparatus for the treatment of waste without the malodors normally associated with the anaerobic storage and treatment of waste. It should be understood, by those skilled in the art, that the anaerobic basin 603 may operate under psycophillic or mesophilic conditions. The anaerobic basin 603 is illustrated being covered with a flexible or rigid cover, 614, to collect to gas produced by the anaerobic microbial cultures digestion of the waste. Ducts or pipes will convey the gas to a blower, 619, which forces the gas through a scrubber 615. Additional air may be added by another blower 618, 613, aspiration suction dampers (not shown), or similar devices to provide the oxygen to support the metabolism of the autotrophic microbe culture on the scrubber media. Preferably, water is recirculated over the scrubber 615 providing the desired humidity to support the microbial growth. The microbes, usually of the Thiobacillus genus, oxidize the hydrogen sulfide and other malodorous organic sulfide compounds to non-odorous sulfate using the ever present carbon dioxide. Preferably, the treated gases are vented 617 from the scrubber 615. The effluent from the anaerobic basin 603 preferably flows to an aerobic basin 605 to remove the remaining carbonaceous matter as well as, biologically oxidize the ammonia to nitrite and nitrate and subsequently denitrify the nitrate to nitrogen gas. FIG. 26 further illustrates examples of mechanical aeration 606, 624, the transfer 609 of the treated water for washing the waste source 601, as well as, the impermeable cover 614.

Figure 27:
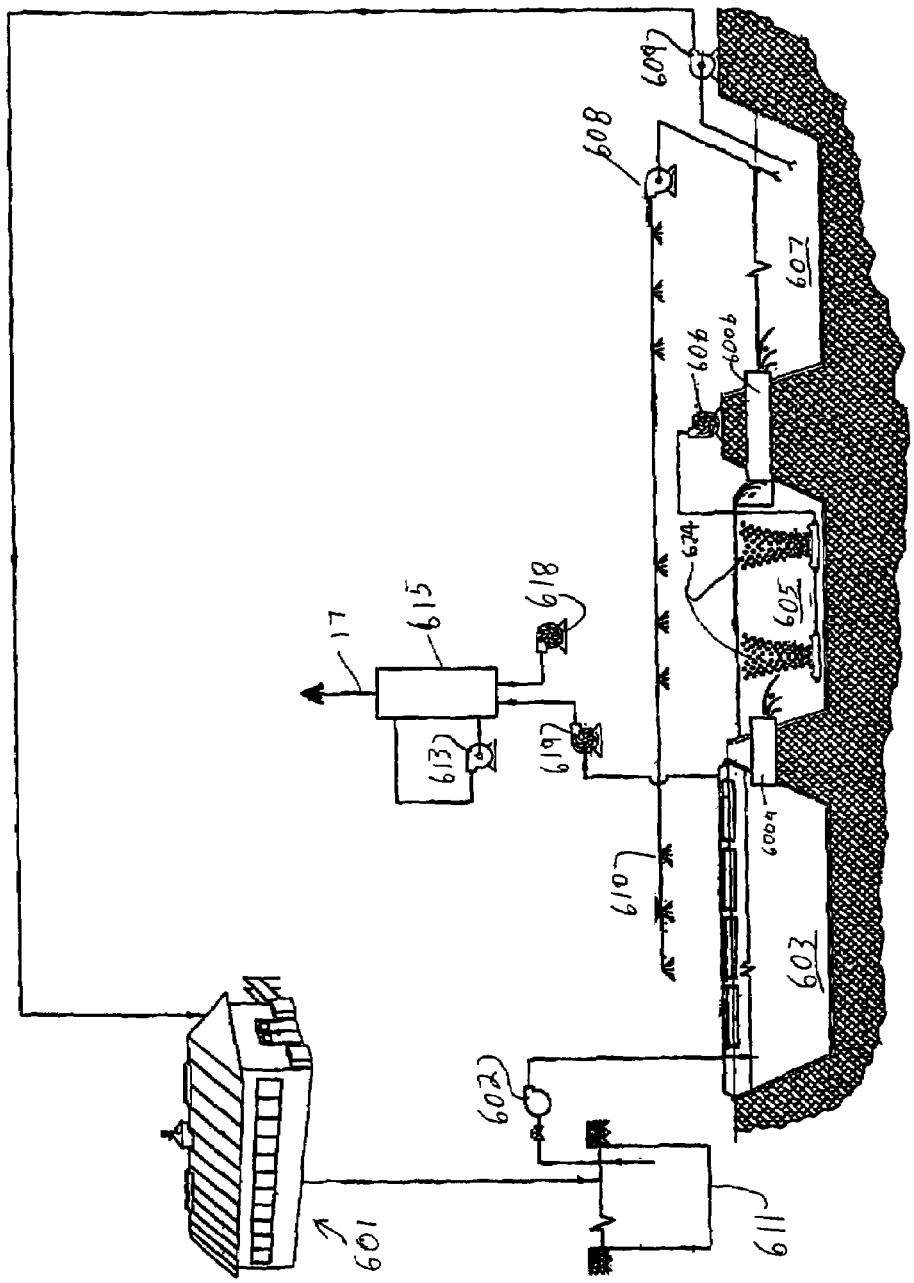
FIG. 27 is an illustration of an alternate embodiment of the present invention.

FIG. 27 illustrates another embodiment of the present disclosure. Here, the treated water as described in FIG. 26 may be solar evaporated to substantially eliminate land application by spraying, through nozzles 610 over the anaerobic basin 603, the aeration basin 605, the storage basin 607, or any combination thereof and thus reduce the volume of the wastewater. It should be appreciated that the treated water can also be extracted, by system 608, from other basins or from more than one basin. FIG. 27 further illustrates examples of mechanical aeration 606, 624, the transfer 609 of the treated water for washing the waste source 601, as well as the impermeable cover 614 and the utilization of the blower 619 and the scrubber system 615.

Figure 28:
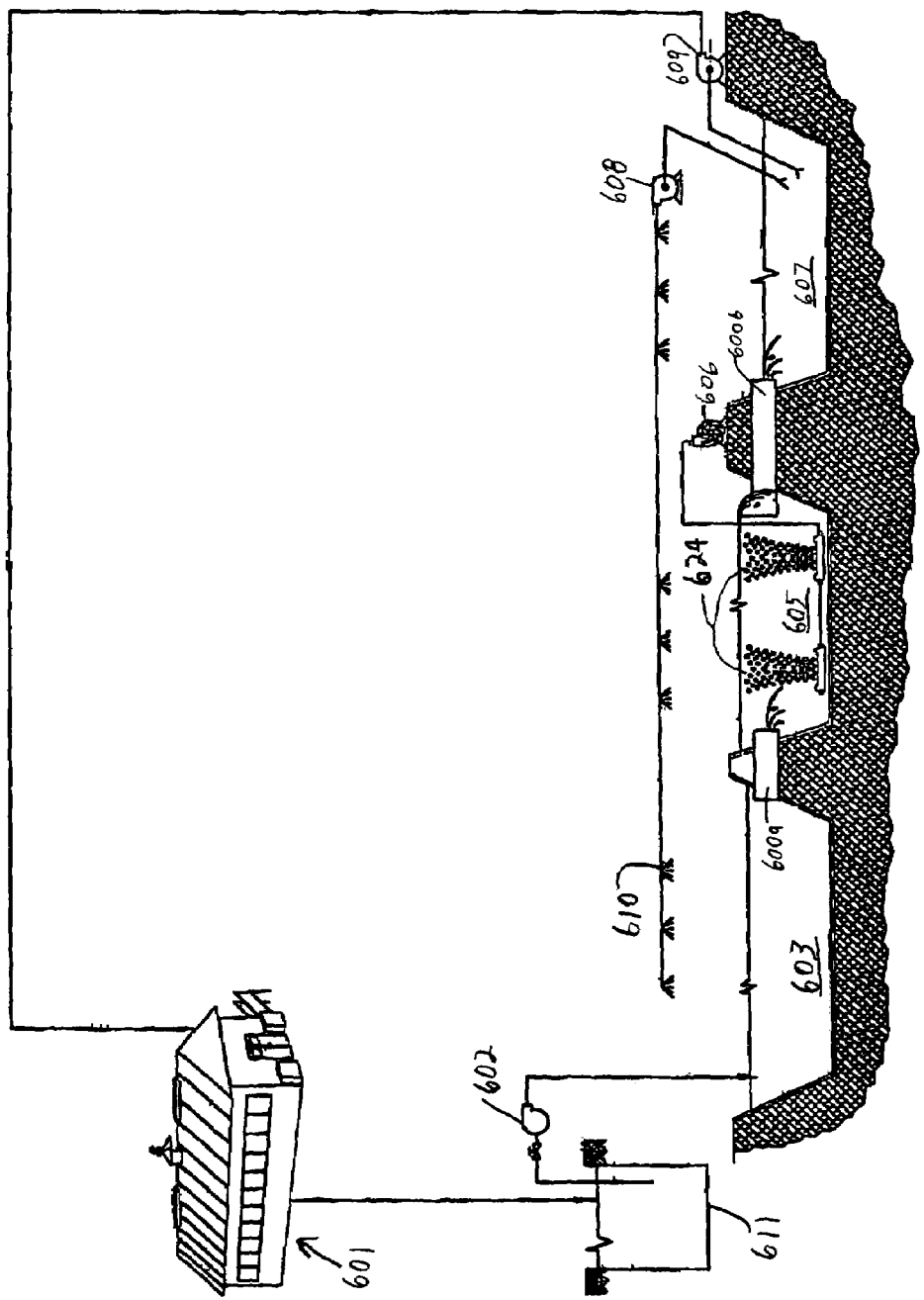
FIG. 28 is an illustration of an alternate embodiment of the present invention.

It should be understood that the process and apparatus, described herein, for the treatment of waste without the malodors normally associated with the anaerobic storage and treatment of waste includes the methods to reduce the volume of wastewater by solar evaporation using aerobic spray over existing open top liquid storage facilities. The system can be installed on existing open top anaerobic waste storage basins to reduce and in many cases eliminate to obnoxious odors and at the same time through solar evaporation, significantly reducing the volume of liquid such that there is no excess liquid waste that must be land applied. As illustrated in FIG. 28, the wastewater taken either from the secondary aeration basin 605 that aerobically treats the effluent from the anaerobic basin 603 is pumped 608 and sprayed, through nozzles 610 over the surface of the anaerobic basin 603. It should be appreciated that if the topography of the farm permits the elevating of the wastewater source 601, above the waste treatment facility, the waste may flow by gravity to the anaerobic basin 603. The effluent from the anaerobic basin 603 may then be transferred by pump 602 or gravity to the aerobic treatment area 605. Exogenous oxygen can be provided by mechanical aeration equipment 624, 606, or by natural surface absorption of oxygen from the atmosphere. The treated water can be collected in a storage basin, 607, and a portion may be used to flush the fresh waste from the waste source 601 by pumping the water with pump 609. The excess water may be pumped 608, from the storage basin 607 and sprayed, through nozzles 610, over the anaerobic basin 603 to provide an oxygenated surface layer on the anaerobic basin 603. Additional water may be sprayed over the aeration basin 605 and/or the storage basin 607.

Figure 29:
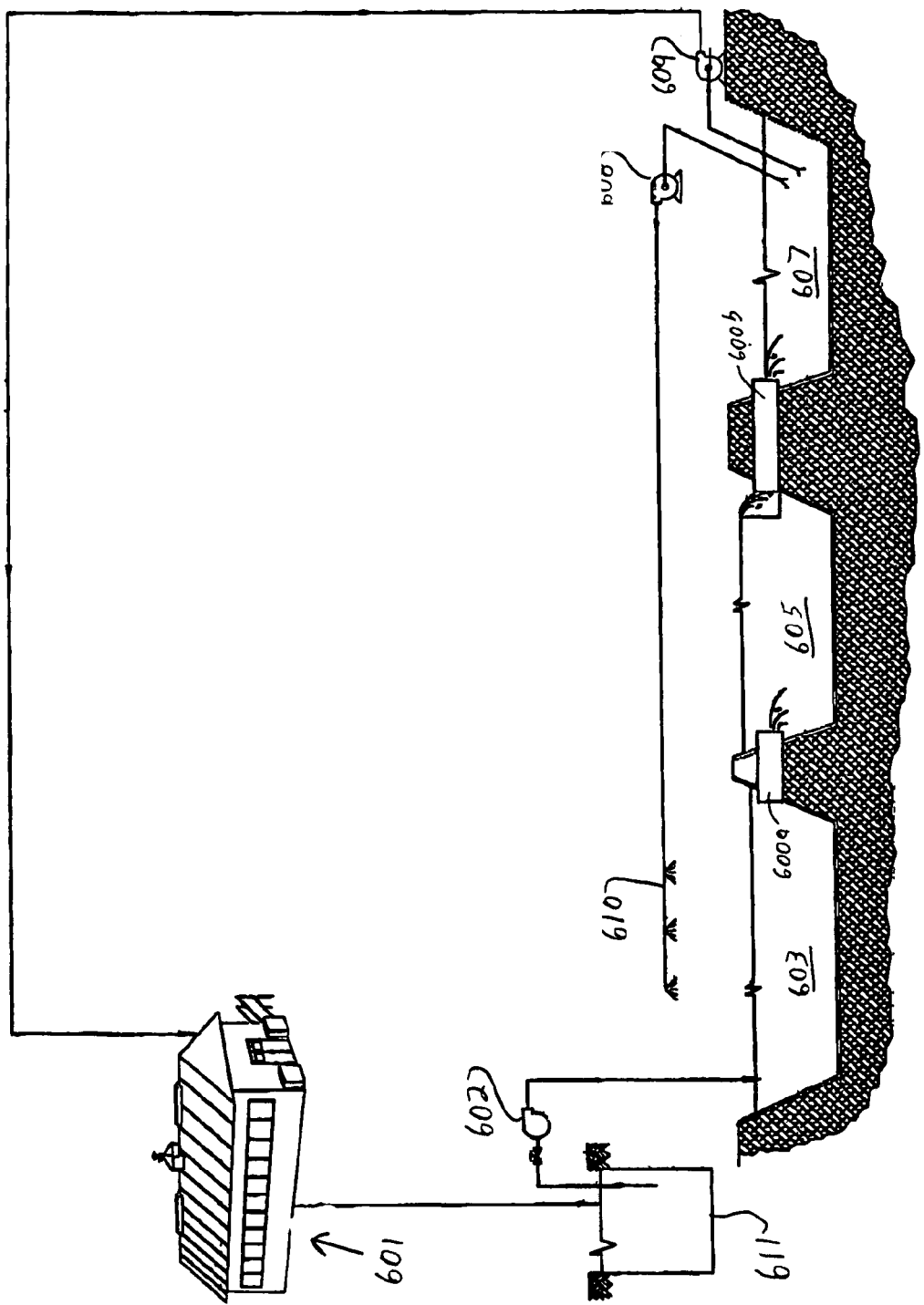
FIG. 29 is an illustration of an alternate embodiment of the present invention.

FIG. 29 illustrates another embodiment, similar to that illustrated in FIG. 28, except no mechanical aeration equipment is utilized to provide the required dissolved oxygen in the aeration basin, 605. The required exogenous oxygen is provided by the natural dissolution of atmospheric oxygen. Further, FIG. 29 illustrates the spray system 608, 610 being applied only over the anaerobic basin 603.

Figure 30:
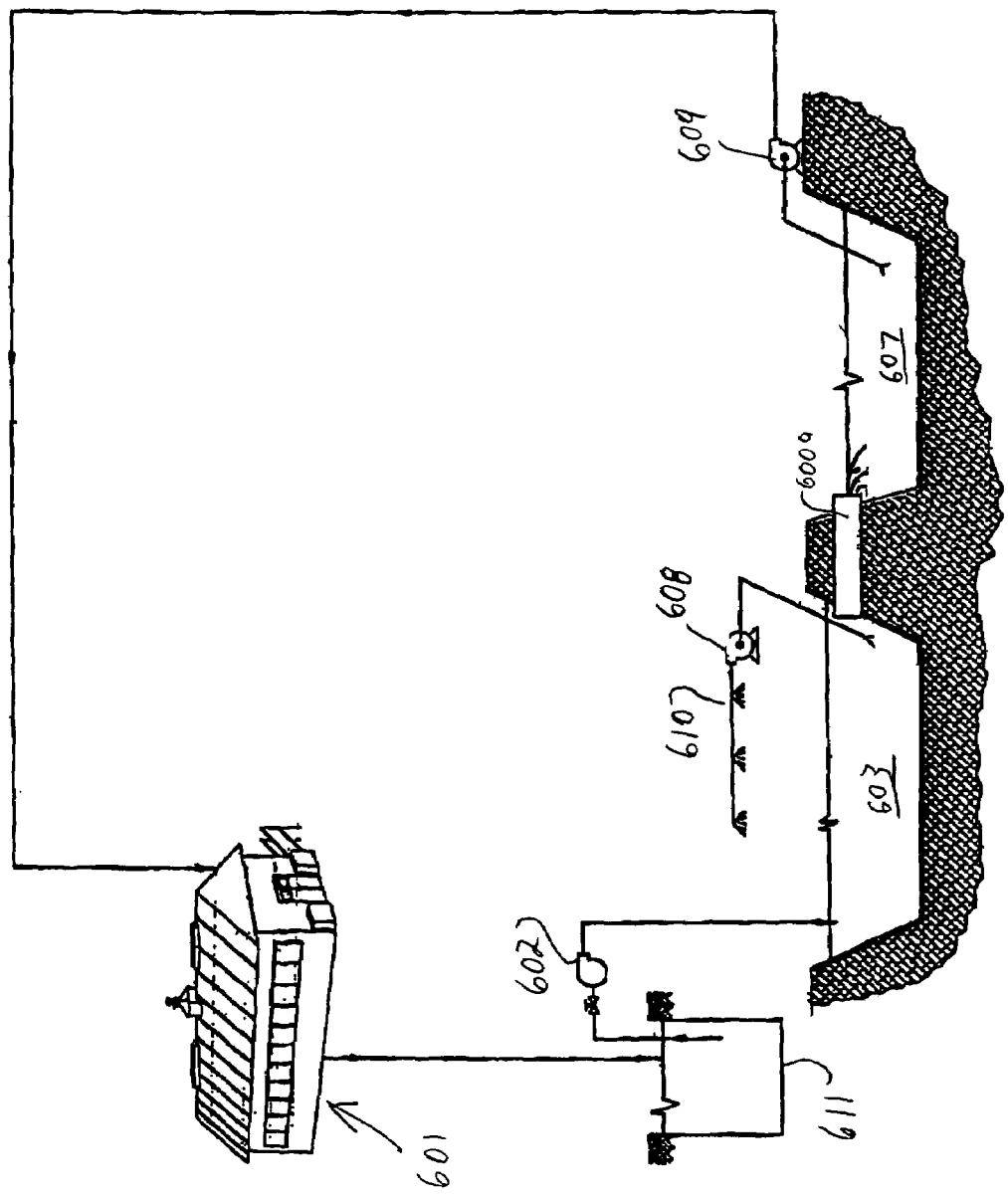
FIG. 30 is an illustration of an alternate embodiment of the present invention.

FIG. 30 illustrates another embodiment wherein the system comprises the anaerobic basin 603 and the storage basin 607. To reduce or eliminate the need for land application of the digested waste, pump 608, will pump the waste from either the anaerobic basin 603 or from a secondary storage basin 607, through nozzles 610, to enhance the evaporation rate. Excess water may be pumped back to the wastewater source 601, for flushing, using pump 609. It should be understood that in this example, storage basin 607 can also be utilized as an aerobic basic wherein the wastewater can be further treated. It should be further understood that the system may operate with only one basin 603 with the excess liquid being sprayed over the basin 603 to substantially eliminate the excess treated wastewater by solar evaporation.

It will be understood that certain features and sub-combinations are of utility and may be employed without reference to other features and sub-combinations. Further, it will be understood that the embodiments described above are capable of many modifications and alterations. This is contemplated by and is within the scope of the claims. It further will be appreciated by those skilled in the art that movement, passing, or pumping of wastewater through the treatment modalities may be accomplished by any suitable method and/or device such as gravity flow or pumping and that terms to describe such movement herein are for illustrative purposes only and not intended to limit the present invention. Although specific examples may have been described and disclosed, the invention of the instant application is considered to comprise and is intended to comprise any equivalent structure and may be constructed in many different ways to function and operate in the general manner as explained hereinbefore. Accordingly, it is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method for treating a source of untreated wastewater contaminated with at least one organic carbon component, the method comprising the steps of:
   moving contaminated untreated wastewater from the source of untreated wastewater directly to a first anaerobic basin;
   growing a first anaerobic microbial culture in the first anaerobic basin;
   degrading the contaminant with the first anaerobic microbial culture, wherein at least part of said degradation produces gas, and wherein the first anaerobic microbial culture removes at least some odor from the produced gas;
   moving wastewater from the first basin directly to a second aerobic basin;
   introducing a substance into said second aerobic basin, wherein said introduced substance supports a second aerobic microbial culture;
   decomposing the organic carbon component in said second aerobic basin to form treated wastewater; and
   moving the treated wastewater from the second aerobic basin.

2. The method of claim 1, wherein the moving of the wastewater from the second aerobic basin further comprises the step of at least one of discharging the wastewater over the first anaerobic basin to keep a membrane moist for growth of a microbial culture and discharging over the second aerobic basin or other basins for aeration of the wastewater to proliferate growth of at least one microbial culture.

3. The method of claim 2, wherein the discharge of the wastewater comprises the step of spraying the wastewater through at least one nozzle so as to allow the wastewater to be at least partially evaporated.

4. The method of claim 1, wherein the moving of the contaminated untreated wastewater to the first anaerobic basin further comprises the step of moving the contaminated untreated wastewater from the source to a lift station, wherein the lift station provides for the movement of the contaminated untreated wastewater to the first basin.

5. The method of claim 1, wherein the source of the contaminated untreated wastewater is an animal housing facility.

6. The method of claim 1, further comprising the step of obtaining additional untreated contaminated wastewater by flushing the floor of a facility with treated wastewater from the second aerobic basin.

7. The method of claim 1, wherein the first anaerobic basin comprises an anaerobic digester for treatment of the contaminated untreated wastewater, said digester containing at least one anaerobic culture, wherein said at least one anaerobic culture reduces the organic content of the at least one contaminant and produces a gas comprising methane, carbon dioxide, hydrogen sulfide, or combinations thereof.

8. The method of claim 7, further comprising the steps of:
   collecting the produced gas from the anaerobic digester; and
   storing the produced gas, burning the produced gas, or combinations thereof.

9. The method of claim 8, further comprising the step of burning the produced gas for a heat source to elevate the temperature of the contaminated untreated wastewater in the anaerobic digester, burning the produced gas to generate electricity, or combinations thereof.

10. The method of claim 7, further comprising the step of covering a first anaerobic digester with a semipermeable membrane that allows the produced gas to slowly diffuse and to become at least partially oxidized and deodorized.

11. The method of claim 10, further comprising the step of using bacteria on the membrane to at least partially oxidize and deodorize the diffusing produced gas.

12. The method of claim 1, further comprising the step of covering the anaerobic digester with a cover that is nonpermeable.

13. The method of claim 1, wherein the substance introduced into the second aerobic basin is exogenous oxygen.

14. The method of claim 13, wherein said exogenous oxygen comprises atmospheric air.

15. A method for treating a source of untreated wastewater contaminated with at least one organic carbon component, the method comprising the steps of:
   moving contaminated untreated wastewater from the source of untreated wastewater directly to a first anaerobic basin;
   growing a first anaerobic microbial culture in the first anaerobic basin; degrading the contaminant with the first anaerobic microbial culture, wherein at least part of said degradation produces gas, and wherein the first anaerobic microbial culture removes at least some odor from the produced gas; moving the wastewater from the first anaerobic basin directly to a second aerobic basin;
   introducing a fluid into said second aerobic basin, wherein said introduced fluid supports a second aerobic microbial culture;
   decomposing the organic carbon component in said second aerobic basin to form treated wastewater;
   moving the treated wastewater to a third basin; and
   moving the treated wastewater from the third basin.

16. The method of claim 15, wherein the moving of the treated wastewater from the second aerobic basin further comprises the step of discharging the treated wastewater over at least one basin.

17. The method of claim 16, wherein the discharge of the treated wastewater comprises the step of spraying the treated wastewater through at least one nozzle to allow the treated wastewater to be at least partially evaporated.

18. The method of claim 15, wherein the fluid introduced into the second aerobic basin is exogenous oxygen.

19. The method of claim 18, wherein said exogenous oxygen comprises atmospheric air.

20. The method of claim 15, further comprising the step of obtaining additional untreated contaminated wastewater by flushing the floor of a facility with treated wastewater from the second aerobic basin, the third basin, or combinations thereof.

21. A method for treating a source of untreated wastewater comprising animal feces with at least one organic carbon component at least a portion of which is an insoluble solid and a nitrogenous waste, the method comprising the steps of:
    growing and proliferating at least one anaerobic culture in a first basin; introducing the untreated wastewater directly from the source of untreated wastewater into said first basin, said first basin containing said at least one anaerobic culture for forming an anaerobic digester, wherein said at least one anaerobic culture reduces the organic content of the solids portion and produces a produced gas comprising methane, carbon dioxide, hydrogen sulfide, or combinations thereof;
    moving at least a portion of the wastewater that has undergone anaerobic digestion from the anaerobic digester to a second basin;
    growing and proliferating at least one aerobic culture in the second basin; and
    treating at least a portion of the wastewater in the second basin with said at least one aerobic culture, wherein said at least one aerobic culture biologically reduces carbon, nitrogen content, or combinations thereof, from said wastewater to form treated wastewater.

22. The method of claim 21, further comprising the step of supplying exogenous oxygen to said microbial cultures to facilitate nitrification, denitrification, biological reduction of carbon, or combinations thereof, and to cause convective flow proximate to said exogenous oxygen into the second basin.

23. The method of claim 21, further comprising the step of storing at least a portion of the treated wastewater downstream from the second basin.

24. The method of claim 23, further comprising the step of spraying wastewater from the first basin, the second basin, treated wastewater stored downstream from the second basin, or combinations thereof, to keep a membrane moist for the growth of a microbial culture.

25. The method of claim 23, further comprising the step of spraying wastewater from the first basin, the second basin, treated wastewater stored downstream from the second basin, or combinations thereof, to keep a membrane moist for the growth of a microbial culture, for the aeration of wastewater for proliferating growth of at least one microbial culture, or combinations thereof.

26. The method of claim 25, wherein the step of spraying further comprises the step of designing a nozzle such that the nozzle produces a water drop sized with a surface area so as to substantially evaporate the treated wastewater, to absorb oxygen into the treated wastewater, or combinations thereof.

27. The method of claim 21, further comprising the step of recycling at least a portion of the treated wastewater from the second basin.

28. The method of claim 27, further comprising the step of washing the source of untreated wastewater with the recycled treated wastewater from the second basin, the treated wastewater downstream from the second basin, or combinations thereof.

29. The method of claim 21, further comprising the step of using at least one aerator in at least one basin to cause convective flow and aerobic conditions proximate to said aerators when the aerators are turned on, and wherein the at least one basin is a basin other than the anaerobic digester.

30. The method of claim 21, further comprising the step of obtaining additional untreated wastewater by flushing the floor of a facility with treated wastewater from the second aerobic basin.

31. A method for treating a source of untreated wastewater contaminated with at least one organic carbon component, the method comprising the steps of:
    moving contaminated untreated wastewater from the source of untreated wastewater directly to at least one separation device and separating at least a portion of the untreated wastewater;
    moving the portion of the untreated wastewater from the at least one separation device to a first anaerobic basin;
    growing a first anaerobic microbial culture in the first anaerobic basin;
    degrading the contaminant with the first anaerobic microbial culture, wherein at least part of said degradation produces gas, and wherein the first anaerobic microbial culture removes at least some odor from the produced gas;
    moving wastewater from the first basin directly to a second aerobic basin; introducing a substance into said second aerobic basin, wherein said introduced substance supports a second aerobic microbial culture;
    decomposing the organic carbon component in said second aerobic basin to form treated wastewater; and
    moving the treated wastewater from the second aerobic basin.

* * * * *